(12) United States Patent
Vahid et al.

(10) Patent No.: US 7,555,658 B2
(45) Date of Patent: Jun. 30, 2009

(54) EMBEDDED ELECTRONICS BUILDING BLOCKS FOR USER-CONFIGURABLE MONITOR/CONTROL NETWORKS

(75) Inventors: Frank Vahid, Corona, CA (US); Susan Lysecky, Tucson, AZ (US)

(73) Assignee: Regents of the University of California, Oakland, CA (US)

(*) Notice: Subject to any disclaimer, the term of this patent is extended or adjusted under 35 U.S.C. 154(b) by 781 days.

(21) Appl. No.: 11/127,035

(22) Filed: May 10, 2005

(65) Prior Publication Data
US 2006/0095893 A1    May 4, 2006

Related U.S. Application Data

(60) Provisional application No. 60/615,062, filed on Sep. 30, 2004.

(51) Int. Cl.
G06F 1/26    (2006.01)
(52) U.S. Cl. .................. 713/300; 713/320; 709/230
(58) Field of Classification Search ............. 713/300; 709/230
See application file for complete search history.

(56) References Cited

U.S. PATENT DOCUMENTS

| | | | |
|---|---|---|---|
| 4,736,367 A | 4/1988 | Wroblewski et al. | |
| 5,510,975 A | 4/1996 | Ziegler, Jr. | |
| 5,579,221 A | 11/1996 | Mun | |
| 6,236,796 B1 | 5/2001 | Tamura et al. | |
| 6,574,234 B1* | 6/2003 | Myer et al. | 370/462 |
| 6,640,141 B2* | 10/2003 | Bennett | 700/19 |
| 6,950,725 B2* | 9/2005 | von Kannewurff et al. | 700/275 |
| 6,976,143 B2* | 12/2005 | Smith et al. | 711/170 |
| 7,015,806 B2* | 3/2006 | Naidoo et al. | 340/531 |
| 7,162,517 B2* | 1/2007 | Hallenbeck | 709/208 |
| 7,187,986 B2* | 3/2007 | Johnson et al. | 700/17 |
| 7,295,099 B2* | 11/2007 | Lee et al. | 340/5.54 |
| 2002/0044042 A1 | 4/2002 | Christensen et al. | |
| 2002/0047774 A1 | 4/2002 | Christensen et al. | |

FOREIGN PATENT DOCUMENTS

WO    WO 97/12349 A1    4/1997

OTHER PUBLICATIONS

Aizawa, K. "On Sensor Image Compression." *IEEE Transactions on Circuits and Systems for Video Technology* (Jun. 1997), 7(3):543-548.

(Continued)

*Primary Examiner*—Nitin C Patel
(74) *Attorney, Agent, or Firm*—Townsend and Townsend and Crew LLP

(57) ABSTRACT

Stand-alone modules or blocks for use in creating low-power sensor-based monitor/control systems. Each module performs a pre-defined function, and when included in a monitor/control network operates as a node on the network and automatically communicates with one or more connected nodes using a uni-directional packet-based protocol. One class of such predefined nodes communicates Boolean values, for example, with input sensor nodes detecting the presence or absence of environmental phenomena (e.g., motion, light, sound, water, button presses, etc.), intermediate nodes transforming those Boolean values using combinational or sequential logic, and output nodes converting the resulting Boolean values to environmental phenomena (e.g., beeping, light, electric relay activation, etc.) or to data for further processing by a computer. Another class of nodes communicates integer or number values.

24 Claims, 23 Drawing Sheets

Various applications built with blocks, (a) Wireless Doorbell, (b) Animal-Monitoring System, (c) Cafeteria Food Alert, (d) Sleepwalker Detector.

OTHER PUBLICATIONS

Borovoy, R. et al. "Things that blink: Computationally augmented name tags." *IBM Systems Journal* (1996), 35(3 & 4), pp. 488-495.

Clarkson, M. "Smart Sensors." *Sensors Magazine* (May 1997), pp. 14-20.

Hill, J. et al. "MICA: A Wireless Platform For Deeply Embedded Networks." *IEEE Micro* (Nov./Dec. 2002), 22(6):12-24.

Horton, M. et al. "MICA: The Commercialization Of Microsensor Motes." *Sensors Online* [www.sensorsmag.com] (Apr. 2002), pp. 40-48.

"Interoperable Home Infrastructure." *Intel Technology Journal* (Nov. 2002), 6(4).

Johnson, C. "Smart Sensors Extend Web Scale." *EE Times* (Apr. 2001), 3 pgs.

Kharma, N. et al. "Magic Blocks: A Game Kit For Exploring Digital Logic." Proceedings of the 2002 American Society For Engineering Education Annual Conference and Exposition, American Society for Engineering Education (2002), pp. 1048-1061.

Lee, K. "A Synopsis of the IEEE P1451—Standards for Smart Transducer Communication," National Institute of Standards and Technology (1999), 6 pgs.

Licht, T.R., et al. "The IEEE 1451.1 Proposed Standard And Emerging Compatible Smart Transducers and Systems." National Institute of Standards and Technology (2000), 10 pgs.

Licht, T.R., et al. "1451.4 IEEE Standard for A Smart Transducer Interface for Sensors and Actuators—Mixed- Mode Communication Protocols and Transducer Electronic Data Sheet (TEDS) Formats." Technical Committee on Sensor Technology TC-9, IEEE Instrumentation and Measurement Society (Dec. 2004), 430 pgs.

Martin, F. et al. "The MIT Programmable Brick." http://lcs.www.media.mit.edu/groups/el/projects/programmable-brick/ (Feb. 1998), 2 pgs.

Martin, F. et al. "Crickets: Tiny Computers For Big Ideas." http://lcs.www.media.mit.edu/people/fredm/projects/cricket (Dec. 2000), 3 pgs.

Martin, F. et al. "MetaCricket: A designer's kit for making computational devices." *IBM Systems Journal* (2000), 39(3&4):795-815.

Martin, F. et al. "Cricket System Technical Overview." http://llk.media.mit.edu/projects/cricket/about/techtalk/index.html (May 29, 1997), 8 pages.

Papert, S. "Mindstorms: Children, Computers, and Powerful Ideas." *Basic Books*, HapersCollins Publishers (1980), New York.

Potter, D. "IEEE P1451.4's Plug-and-Play Sensors." *Sensors Magazine* [www.sensorsmag.com] (Dec. 2002), pp. 14-22.

Rasheed, Y. et al. "Home Interoperability Framework for the Digital Home," *Intel Technology Journal* (Nov. 15, 2002), 6(4):5-16.

Resnick, M., et al. "LEGO, Logo, & Design." *Children's Environments Quarterly* (1988), 5(4):14-18.

Resnick, M. et al. "Programmable Bricks: Toys to think with." *IBM Systems Journal* (1996), 35(3&4):443-452.

Saffo, P. "Smart Sensors Focus on the Future." *CIO Insight* (Apr. 2002), 4 pgs.

Steinfeld, E. "Devices that play together, work together." *EDN Magazine* [www.ednmag.com] (Sep. 13, 2001). pp. 65-70.

Travis, B. "Sensors Smarten Up." *EDN Magazine* [www.ednmag.com] (Mar. 1999). pp. 76-86.

Wallich, P. "Mindstorms Not Just A Kid's Toy." *IEEE Spectrum* (Sep. 2001), 38(9):52-57.

Warneke, B. et al. "Smart Dust Mote Forerunners." Proceedings of the 14th IEEE International Conference on Micro Electro Mechanical Systems (MEMS 2001), Interlaken, Switzerland (Jan. 21-25, 2001), 4 pages.

Warneke, B. et al. "Smart Dust: Communicating with a Cubic-Millimeter Computer." *Computer Magazine* (Jan. 2001), pp. 44-51.

"Crickets & Sensors: What's a cricket?" http://llk.media.mit.edu/projects/bbb/sections/crickets.html (1998), MIT. Media Lab, 2 pages.

Crossbow Technology, Inc. http://www.xbow.com/ (2005), 2 pgs.

Dust, Inc., http://www.dust-inc.com/ (2002-2005), 1 pg.

eBlocks: Embedded Systems Building Blocks, http://www.cs.ucr.edu/~eblock/simulator, University of California, Riverside, Department of Computer Science (2004), 2 pgs.

Electronic Blocks, http://www.itee.uq.edu.au/~peta/_Electronic Blocks.htm, (2003), University of Queensland, School of Information Technology & Electrical Engineering, 3 pgs.

Epistemology and Learning Group. MIT Media Laboratories. "Beyond Black Boxes." http://llk.media.mit.edu/projects/bbb/ (1998), 1 pg.

How X-10 Works, SmarthomeUSA.com, http://www.smarthomeusa.com/info/x10theory/x10theory/ (1997-2004). Smart Home Systems, 4 pages.

Lego Mindstorms, http://mindstorms.lego.com/eng/default.asp (2004), 2 pgs.

Logiblocks, http://www.logiblocs.com (2002), 5 pages.

Logidules, http://diwww.epfl.ch/lami/teach/logidules.html, The LAMI: Laboratoire de Microinformatique Microprocessor and Interface Lab (Apr. 1997), 2 pgs.

"MICA Wireless Measurement System", product information, 2 pages.

Phidgets, http://www.phidgets.com/ (2003), Phidgets Inc., 2 pgs.

Programmable bricks, http://llk.media.mit.edu/projects/cricket/ (2005), 4 pgs.

RoboBRiX, Modular Robotics System, http://www.robobrix.com/ (2003/4), 1 p.

Smart Dust: Autonomous sensing and communication in a cubic millimeter, http:robotics.eecs.berkeley.edu/~pister/SmartDust/ (2004), 5 pgs.

Smarthome Inc., http://smarthome.com/ (1995-2005), 2 pgs.

Teleo, http://www.makingthings.com/ (2002-2004), 2 pgs.

The X-10 Story, SmarthomeUSA.com, http://www.smarthomeusa.com/info/x10story/x10story/ (1997-2004); Smart Home Systems, 2 pages.

X10 protocol, http://www.x10.org [redirected to http://www.smarthome.com/prodindex.asp?catid=2] (1995-2005), 2 pgs.

* cited by examiner

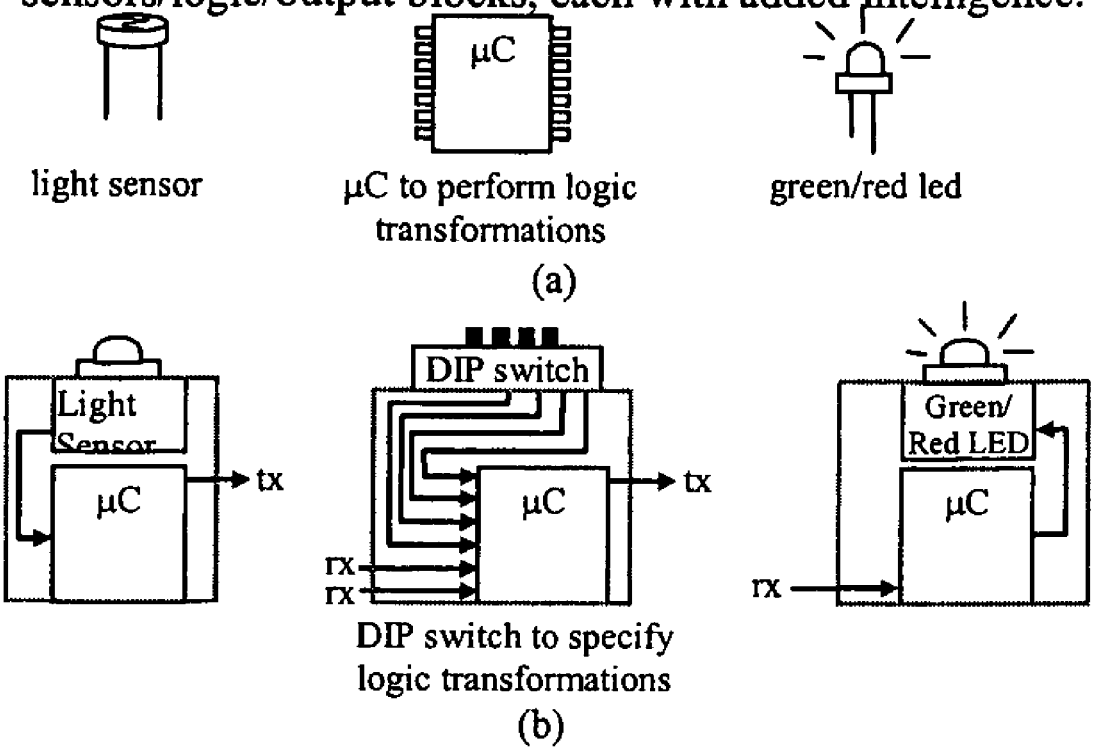
Figure 1: (a) "Dumb" sensors/logic/outputs and (b) sensors/logic/output blocks, each with added intelligence.

| Sensor Blocks ||||
|---|---|---|---|
| Block | Diagram | Description | Interface |
| Button | | Sensor detects when the button is pressed. | yes = button pressed<br>no = button not pressed |
| Light Sensor | | Sensor detects the presence of light. | yes = light detected<br>no = light not detected |
| Magnetic Contact Switch | | Sensor detects when a magnet is near the sensor. | yes = magnet near<br>no = magnet not near |
| Motion Sensor | | Sensor detects the presence of motion. | yes = motion detected<br>no = motion not detected |
| Light-Beam Switch | | Sensor detects when the light beam is broken. | yes = beam broken<br>no = beam not broken |
| Sound Sensor | | Sensor detects the presence of sound. | yes = sound detected<br>no = sound not detected |
| Water Sensor | | Sensor the presence of water. | yes = water detected<br>no = water not detected |
| 3-Key Entry | | Sensor detects if the sequence of keys are pressed correctly. | yes = proper sequence entered<br>no = proper sequence not entered |
| 10-Key Entry | | Sensor detects if the sequence of keys are pressed correctly. | yes = proper sequence entered<br>no = proper sequence not entered |

Fig. 2a

| Output/Display Blocks |||| 
| Block | Diagram | Description | Interface |
|---|---|---|---|
| Beeper | 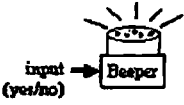 | Device emits a beeping sound. | yes = beeper on<br>no = beeper off |
| Green/Red light | 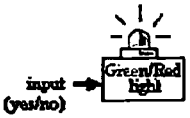 | Device emits a green or red light. | yes = light is green<br>no = light is red |
| Normal light | 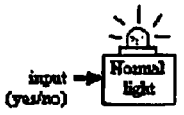 | Device emits a light. | yes = light is on<br>no = light is off |
| Electric Relay | 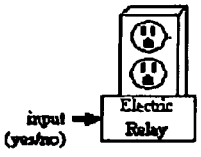 | Device transmits electricity. | yes = electricity on<br>no = electricity off |
| Electric Lock | 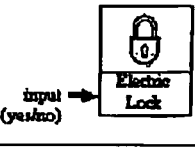 | Device locks and unlocks. | yes = lock<br>no = unlock |
| Lightswitch | 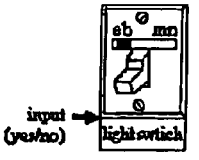 | Light switch has 2 modes, eb and mn. In the eBlock mode (eb) the lightswitch is controlled by other eBlocks. If it recieves and input of yes then electricity is tranmistted to devices controlled by the lightswitch. If it recieves and input of no then no electricity is transmitted to devices controlled by the lightswitch. In manual mode (mn) the lightswitch is controlled by the switch on the faceplate. | In eb mode:<br>yes = electricity on<br>no = electricity off |

Fig. 2b

| Arithmetic/Logic Blocks | | | |
|---|---|---|---|
| Block | Diagram | Description | Interface |
| 2-Input Logic | 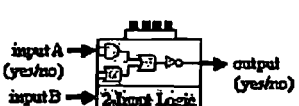 | Device computes several logic functions based on two inputs. The corresponding logic function is programmed by the user via a dipswitch. | input output<br>a b  yes no<br>yes yes<br>yes no<br>no yes<br>no no<br><br>For each of the possible combinations of input a and b, there is a corresponding switch which can be set so the resulting output is a yes or no for that particular combination. |
| 3-Input Logic | 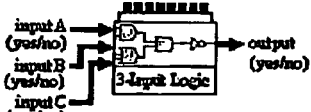 | Device computes several logic functions based on three inputs. The corresponding logic function is programmed by the user via a dipswitch. | input output<br>a b c  yes no<br>yes yes yes<br>yes yes no<br>yes no yes<br>yes no no<br>no yes yes<br>no yes no<br>no no yes<br>no no no<br><br>For each of the possible combinations of input a, b, and c there is a corresponding switch which can be set so the resulting output is a yes or no for that particular combination. |
| Inverter | 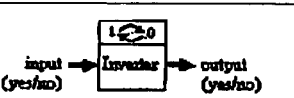 | Outputs the opposite of the input signal. | yes = input is no<br>no = input is yes |

Fig. 2c

| Timer | | | |
|---|---|---|---|
| Block | Diagram | Description | Interface |
| Clock Timer | [Clock Timer → output (yes/no)] | Device has a 24-hour clock. The user can set pins to indicate at which times to toggle the output of the device. | yes = previous output was no and toggle encountered<br><br>no = previous output was yes and toggle encountered |
| Up/Down Timer | [start (yes/no) → Up/Down Timer → output (yes/no); rst (yes/no); enter, up, down] | *Count up mode:* User indicates time the timer counts up to. When the start input is yes, the device will count up to the user indicated time. When the rst input is yes the timer will start at zero and count up to the user defined time again.<br><br>*Count down mode:* User indicates the start time. When the start input is yes the device counts down to zero. When the rst input is yes the timers starts at the user defined time and counts down to zero. | INPUTS:<br>start = yes, start timer<br>start = no, stop timer<br><br>rst = yes, reset timer<br>rst = no, normal timer functionality<br><br>OUTPUT:<br>*Count up mode:*<br>yes = user defined time reached<br>no = user defined time not reached<br><br>*Count down mode:*<br>yes = time zero reached<br>no = time zero not reached |
| Alarm/Clock Timer | [alert (yes/no) → Alarm/Clock Timer → output (yes/no); rst (yes/no); enter, Alarm Clock] | User first selects clock mode to set the current time. User then can set a specific time in alarm mode in which the alarm is activated. If the alert input is yes, the alarm will turn on at the user at the specified alarm time. If the alert input is no, the alarm will never activate. Once the alarm is on, setting rst to yes will turn the alarm off for | INPUTS:<br>alert = yes, enable alarm feature<br>alert = no, disable alarm feature<br><br>rst = yes, reset alarm if on<br>rst = no, do nothing<br><br>OUTPUTS:<br>yes = alarm time reached and alert input is yes<br>no = start input is no or rst input is yes |

Fig. 2d

| Communication Blocks | | | |
|---|---|---|---|
| Block | Diagram | Description | Interface |
| Wireless Transmitter | 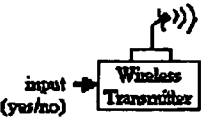 | Device wirelessly transmits a signal. | yes = input is yes<br>no = input is no |
| Wireless Receiver | 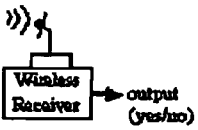 | Device wirelessly receives a signal. | yes = yes recieved<br>no = no recieved |
| Splitter |  | Receives a signal and replicates that signal on each output. | OUTPUT:<br>yes = input yes<br>no = input no |
| Internet Controller | 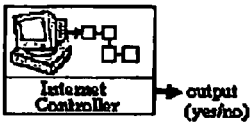 | Control the output of this block via internet. | Output:<br>yes = input from internet yes<br>no = input from internet no |
| Internet Status | 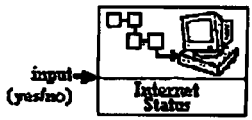 | View status of this block via the internet, or program the block to send an email given a user specified condition. | |
| Telephone Controller | 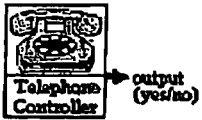 | Control the output of this block via telephone. | Output:<br>yes = input from telephone yes<br>no = input from telephone no |
| Telephone Status | 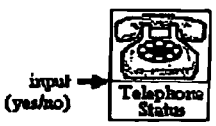 | View status of this block via the internet, or program the block to call a telephone number and leave a message given a user specified condition. | |

Fig. 2e

| Miscellaneous Blocks |||||
|---|---|---|---|
| Block | Diagram | Description | Interface |
| Toggle |  | Device outputs the opposite of the value currently outputted when input is yes. | yes = current output is no and input is yes<br>no = current output is yes and input is yes |
| Yes Prolonger | 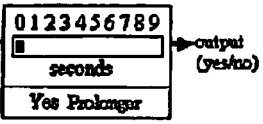 | Device lengthens a yes signal. When a yes signal is recieved, the device keeps outputting yes for the duration of that signal and keeps outputting a yes for X seconds after the no signal is recieved. The user specifies how long X is equaled to. | yes = received yes as input and has not timed out<br>no = received no as input and timed out |
| Once Yes, Stays Yes | 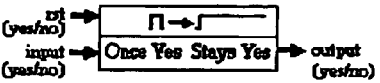 | Device outputs a yes when an input of yes is recieved. Device continues to output a yes until it is reset. | yes = received yes on input and has not been reset<br>no = received no as input and is reset |
| Pulse Generator | 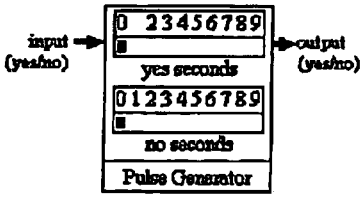 | Device keeps outputting yes followed by no. User defines the duration of yes and duration of no. | INPUT:<br>yes = generate pulse<br>no = output no<br><br>OUTPUT:<br>yes = yes duration has not timed out<br>no = no duration has not timed out |
| Yes/No Switch | 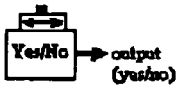 | User sets switch to yes or no position to indicate what the block will output. | yes = switch is in yes position<br>no = switch is in no position |
| Error Detector |  | Device outputs a yes when an input of error is recieved. Device outputs a no in all other situations. | yes = input is error<br>no = input is yes or no |

Fig. 2f

| Sensor Blocks ||||
|---|---|---|---|
| Block | Diagram | Description | Interface |
| Temperature Sensor | [Temperature Sensor → output (num)] | Device outputs the current temperature in Fahrenheit. | output = current temp (F) |
| Distance Sensor | [Distance Sensor → output (num)] | Sensor outputs the distance between the device and another object. | output = distance (ft) |

| Output/Display Blocks ||||
|---|---|---|---|
| Block | Diagram | Description | Interface |
| Integer Display | input → [Integer Display] (num/yes/no) | Device displays the integer value recieved. | Displays the input. |

Figure 3a

| Arithmetic/Logic Blocks ||||
|---|---|---|---|
| Block | Diagram | Description | Interface |
| Threshold | 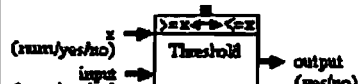 | Device determines if input is <= x or input >= x, depending on what switch is set to. | >= x MODE:<br>output = yes, (input >= x)<br>output = no, (input < x)<br><br><= x MODE:<br>output = yes, (input <= x)<br>output = no, (input > x) |
| Range |  | Device determines if the input is within the x and y range (inclusive). | output = yes, x <= input <= y<br>output = no, input < x OR input > y |
| Equation/Math | 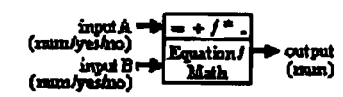 | User defines the function of the math block, and the block calculates A *function* B. | output = A *function* B |
| Turnstile Counter |  | The value held by the counter is incremented by the input value. The rst input will reset this value to zero. | INPUT:<br>input = yes, increment value held by 1<br>input = no, increment value held by 0<br>input = num, increment value held by num<br><br>OUTPUT:<br>output = value held by counter block |
| Constant |  | The user specifies a constant value. | value = user defined |

Figure 3b

| Timer Blocks |||| 
| --- | --- | --- | --- |
| Block | Diagram | Description | Interface |
| Seconds Timer |  | The user selects the granularity of the time kept track of. When timer is activated it counts by the granularity specified. | INPUT:<br>start = yes, activate time<br>start = no, stop nothing<br><br>rst = yes, reset the timer to zero<br><br>OUTPUT:<br>output = time passed since start set to yes and rst set to no. |

Figure 3c

| Miscellaneous Blocks |||| 
|---|---|---|---|
| Block | Diagram | Description | Interface |
| Turnstile Logger | 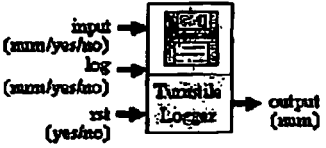 | Device keeps a list of inputs; the input value is logged when the log input is yes. Later the list of inputs can be retrieved from the logger unit. The list is cleared when reset is yes. | log = yes, log the current input value<br>log = no, do nothing<br><br>rst = yes, clear input values held by logger |

Figure 3d

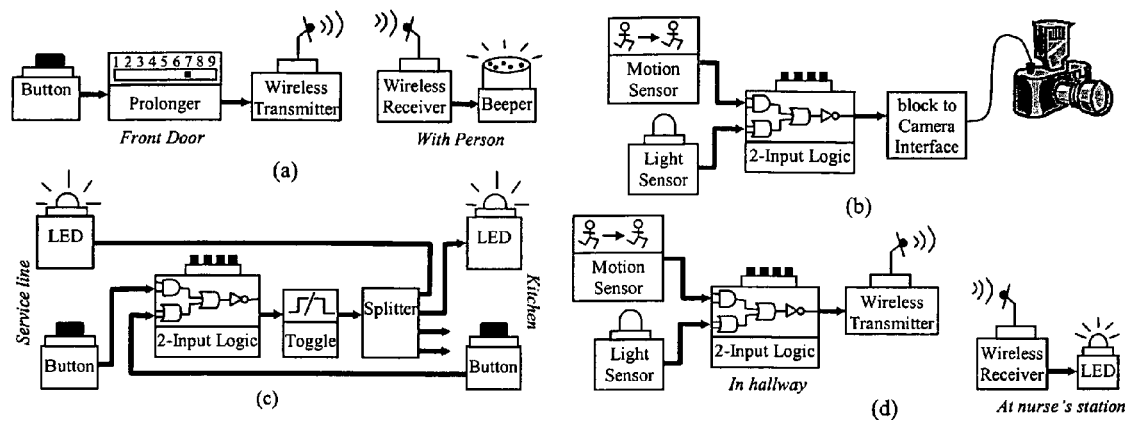
Figure 4: Various applications built with blocks, (a) Wireless Doorbell, (b) Animal-Monitoring System, (c) Cafeteria Food Alert, (d) Sleepwalker Detector.

Figure 9: Basic sequential nodes: (a) "1" prolonger, (b) toggle, (c) tripper. The packet sequence need not be shown.
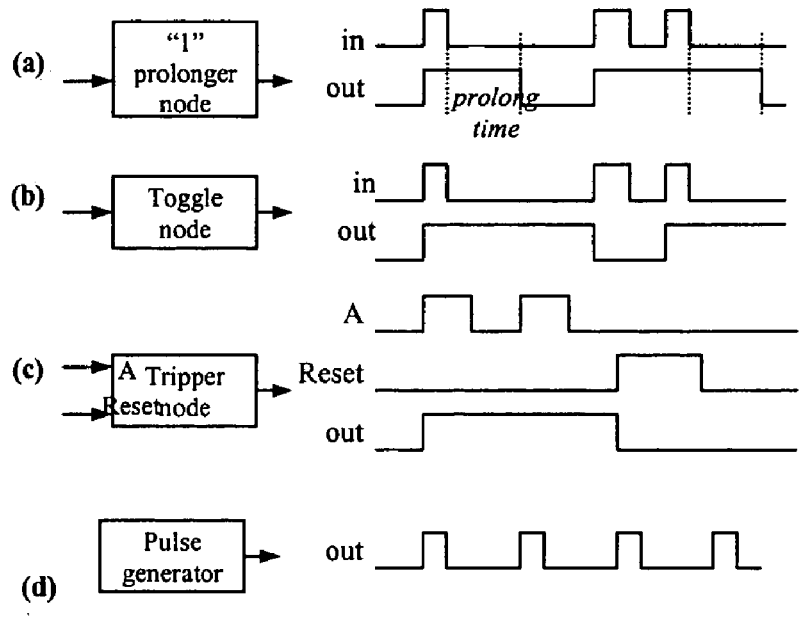
Figure 10: Design Framework.
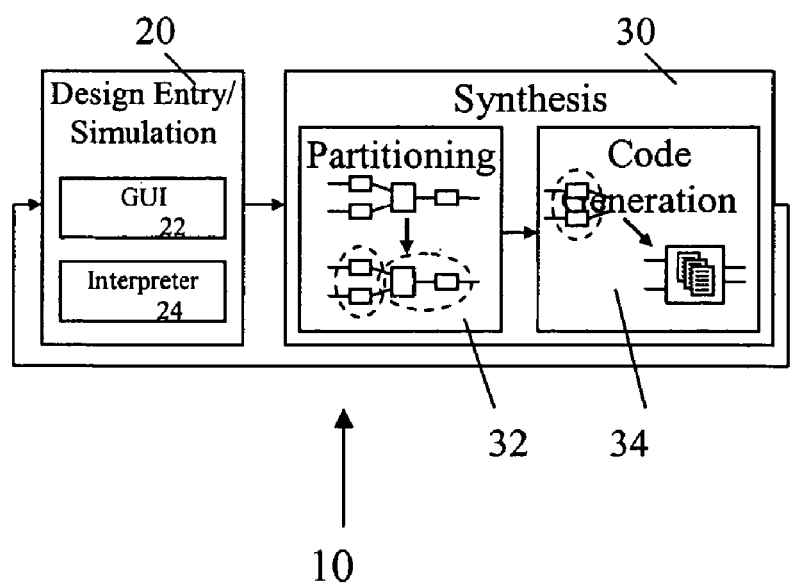

Block Simulator Version 2.1

Block Simulator Version 2.1

Block Simulator Version 2.1

Figure 12: Decomposition Method Pseudocode.

PareDown heuristic
   *blocks* ← list of inner blocks
      *partitions* ← empty list
      while *blocks* contains elements
         *partition* ← blocks
         while *partition* contains elements
         if *partition* fits in a programmable block
then
                if *partition* contains more than one block then
                add *partition* to *partitions*
         else if *partition* contains zero blocks
             return *partitions*
         end if
         remove elements in *partition* from *blocks*
         else
            compute ranks for border blocks in *partition*
            remove border block from *partition* with the least rank
         end if

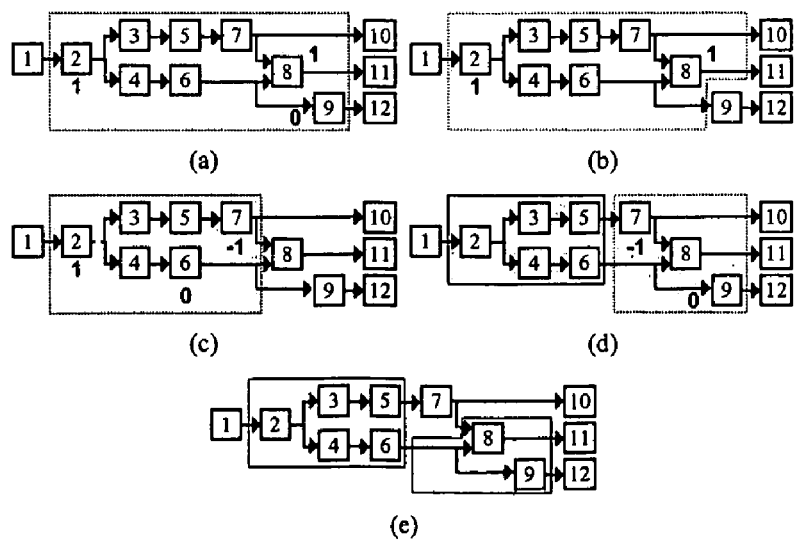

Figure 14: Decomposition Method Example.

FIG. 15a
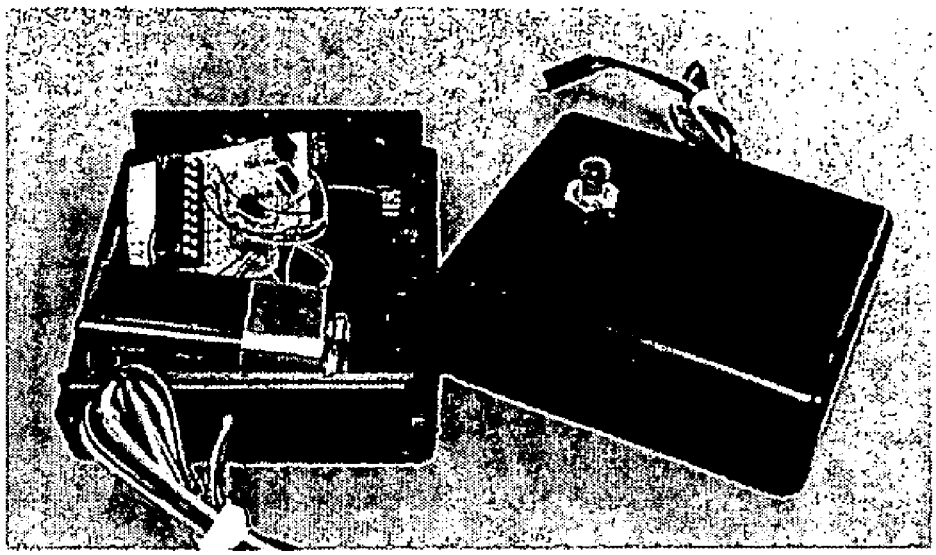
Figure 15b: Garage Door Open At Night System built using blocks of the present invention.
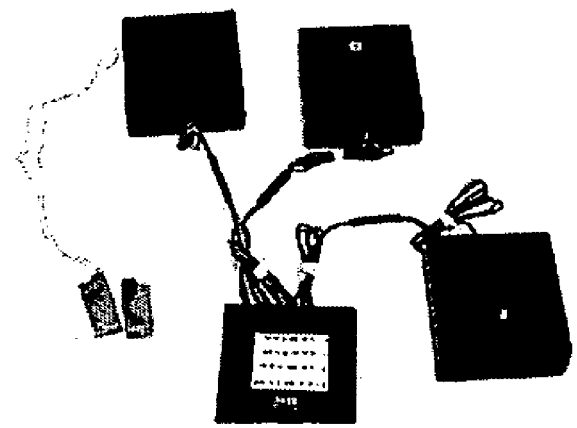

EMBEDDED ELECTRONICS BUILDING BLOCKS FOR USER-CONFIGURABLE MONITOR/CONTROL NETWORKS

CROSS-REFERENCES TO RELATED APPLICATIONS

This application claims the benefit of U.S. provisional application No. 60/615,062, filed Sep. 30, 2004, which is hereby incorporated by reference in its entirety.

STATEMENT AS TO RIGHTS TO INVENTIONS MADE UNDER FEDERALLY SPONSORED RESEARCH AND DEVELOPMENT

The government may have certain rights to the invention based on National Science Foundation Grant CCR-0311026.

BACKGROUND OF THE INVENTION

The present invention relates generally to monitor and control (monitor/control) networks and systems, and in particular to stand-alone embedded system building blocks for use in creating user-configurable monitor/control systems.

The availability of low cost, low power electronics has made ubiquitous monitoring and control realizable through the advent of sensor networks. Monitoring and controlling various aspects of a home, office, store, school, factory, or public spaces can result in improved personal comfort and safety, as well as public security. However, today's monitor/control systems are largely specialized, factory-programmed and configured to perform a specific application, such as home automation or intrusion detection. Though the applications of monitor/control systems are voluminous, high design cost has restricted all but the most commercially viable products from entering the market, resulting in an unfulfilled void of useful applications. For example, a homeowner may want notification of a garage door open at night or of a sleepwalking child; an office worker may want to know whether mail exists for him in the mailroom, whether a copy machine is free, or whether conference rooms are in use. These applications are useful but generally lack the expected volume to justify producing dedicated products to address them (or resulting in high-priced dedicated products), and yet contracting a customized system would be cost prohibitive.

Technological advances in miniaturization, wireless communication, and power efficiency have recently made feasible the development of low-cost, intelligent, and configurable networks of devices, known generally as sensor networks. Much previous work has been done in examining new ways to implement old systems using new technology. This work can be categorized as follows—pre-manufactured products, programmable products, board products, and block products.

Pre-Manufactured Products

Pre-manufactured products are typically designed for a specialized task. The benefit of pre-manufactured products is that these products are ready to use off-the-shelf. One drawback, however, is that each pre-manufactured system has typically been designed to solve only one problem and is not easily customizable to other situations. Smarthome (Smarthome Inc.,) is one such company that provides over 5,000 pre-manufactured home automation products such as X10 switches and wall receptacles, motorized drape controllers, mail alert sensors, etc. Each product serves a single purpose and cannot easily be customized or re-used for other applications. For example, if a consumer purchases a wireless doorbell, they must use the included button and further cannot customize the doorbell to sound when motion is detected or to sound only during the day.

Programmable Products

Programmable products are intended to be easily programmed by the user so that customized systems can be constructed. The user determines how the system should be linked together and what the desired output should be. Unlike pre-manufactured products, programmable products are applicable to many different situations. However, they also require that a user successfully programs the product, where the product's intended audience dictates the ease of programming required.

Programmable products, especially those designed for education and toys, must be easy to understand and program. Users cannot be required to read extensive datasheets to understand how a particular product works or be expected to take extensive programming courses. One programmable product, MIT Crickets, for example, which evolved from the MIT Programmable Bricks project, includes tiny computers powered by 9-volt batteries that receive information from two sensors and control two motors. (See, e.g., Martin, F., et al. The MIT Programmable Brick, and Martin, F., et al. Crickets: Tiny Computers for Big Ideas. Users program Crickets using the Logo language, which is a simple, graphical, highly intuitive language, to perform a variety of functions. (See, e.g., Resnick, M., S. Ocko, and S. Papert, LEGO, Logo, and Design, Children's Environments Quarterly 5, No. 4, pg. 14-18, 1988.) Crickets provide an introduction to programming and electronics to kids and are designed for science education. Crickets also provided the foundation for the Lego Mindstorm product, which consists of numerous sensor and actuator Lego blocks used in conjunction with standard Lego blocks and that connect to a central microprocessor block. (See, e.g., Wallich, P. Mindstorms Not Just a Kid's toy. IEEE Spectrum, September 2001; and LegoMindstorms,) Again, users must program the processor using a simple graphical language.

Programmable products are also often aimed at industrial applications. One such example is Phidgets, a system including sensors and actuators that connect to a central board communicating with a PC. (See, Phidgets,) The PC is used to monitor and control the corresponding modules over a USB connection. Programming Phidgets using Visual Basic, users can quickly prototype systems. Teleo is another example of a system in which a user selects sensors and actuators and connects the components to a central module. (See, Teleo,) The central module is connected to a PC and can be programmed utilizing a variety of languages. However, unlike Phidgets, Teleo incorporates memory within the central module and can be disconnected from the computer.

Another programmable product, Mica Motes, include miniature wireless sensing devices incorporating sensing, communication, and I/O capabilities and are intended to last years in the field utilizing only a pair of AA batteries. (See, Horton, Mike. et al. MICA: The Commercialization of Microsensor Notes. Sensors Online, April 2002.) Each Mica node consists of processor/radio circuits that are sandwiched together with sensor circuits. A system designer would customize the Mica node to their particular application by selecting which sensors are incorporated. A collection of Mica nodes are capable of self-configuring a multi-hop network, utilizing RF communication, and support dynamic reprogramming within the network. The nodes also contain the TinyOS operating system and allow designers to customize communication protocols. The newest generation of these wireless platforms is Smart Dust, which are on the millimeter scale in size. (See, Smart Dust, 2004.) These devices share many of the characteristics of the Mica nodes but utilize optical communication and have more restrictive power utilization limits. To use either the Mica Motes or Smart Dust, users must choose which sensors to utilize, program each node, and decide what communication protocols best fit the desired system. These devices are intended for people with programming and electronics experience.

Board Products

Board products include electronic components that must be connected on top of a specialized circuit board typically intended to provide power to the individual components. One example is Magic Blocks, which were designed to teach pre-university students basic logic theory before the students begin university level computer science classes. (See, Kharma, N. and L. Caro. Magic Blocks: A Game Kit for Exploring Digital Logic. American Society for Engineering Education Annual Conference, 2002.) Magic Blocks users are guided with an instruction manual that explores various logic ideas by having students build various projects. Magic Blocks are aimed more at an educational setting. Using Magic Blocks in real life would be challenging, if not impossible, due the physical setup of these systems as well as the low level components. Additionally, the various gate level blocks would be confusing to users who have no computer science background.

Block Products

Block products are composed of electronic components that can be connected together to build the desired system and do not require a central module or specialized circuit board to implement the systems. Users simply need to connect the desired blocks together to build complete systems. One example is Logidules, which were designed to help university level students studying electronics to build hardware systems. (See, Logidules, 2004.) Using Logidules, students snap together boxes that represent a range of components from logic gates to microprocessors. The design of Logidules eliminates the need for users to connect power to each component and users need only worry about wiring between the devices. Another type of block product, Logiblocs, include small plastic blocks that users snap together to build various systems and which include light sensors, buttons, AND, OR, NOT, speakers, bleeps, LEDs, etc. (See, Logiblocks,) Logiblocs are intended for education and toys. Another type of block product, Electronic Blocks, include blocks that include processors incorporated inside of LEGO Duplo Prima blocks. (See, Electronic Blocks,) Users simply stack the correct combination of blocks to produce the desired output. Electronic Blocks are designed for students between the ages of 3 to 8 years old and are limited in use for older students due to the simplicity of the blocks. Currently, most block products are designed for younger individuals and therefore the possible systems that one can build are simplistic with no ability to create more advanced systems. Another example, RoboBrix, includes components that users plug together to build functioning robots quickly. (See, RoboBRiX,) Some modules contain a PIC microprocessor incorporating intelligence to allow components to be connected together as necessary to build a robot. Other RoboBrix modules include components such as connectors, servos and breadboards, but do not include a microprocessor. RoboBrix are intended to aid in building robotic systems and are not intended for monitor/control embedded system applications.

It is therefore, clear that a generalized set of building blocks that could be easily combined to create monitor/control systems and networks to perform a broad range of functions while maintaining ease of use would therefore serve a great need.

BRIEF SUMMARY OF THE INVENTION

The present invention provides stand-alone modules or blocks for use in creating low-power sensor-based monitor/control systems. The present invention also provides methods for creating such monitor/control systems, including methods utilizing simulation and synthesis tools that enable a user to specify a network using pre-defined blocks (representing a behavioral description) and to simulate that network to verify correct behavior, and that automatically synthesize an optimized network using programmable blocks with automatically generated software.

Each module performs a pre-defined function, and when included in a monitor/control network operates as a node on the network and automatically communicates with one or more connected nodes using a uni-directional packet-based protocol. One class of such predefined nodes communicates Boolean values, for example, with input sensor nodes detecting the presence or absence of environmental phenomena (e.g., motion, light, sound, water, button presses, etc.), intermediate nodes transforming those Boolean values using combinational or sequential logic, and output nodes converting the resulting Boolean values to environmental phenomena (e.g., beeping, light, electric relay activation, etc.) or to data for further processing by a computer. Another class of nodes communicates integer or number values.

In one aspect, the present invention provides stand-alone modules, or blocks, that enable regular people, having no electronics or programming experience, to construct basic but useful customized sensor-based systems. An example of one such system might alert a homeowner that their garage door has been left open at night. With the modules of the present invention, the homeowner could purchase a contact switch sensor block, a light sensor block, a logic block, and an LED (light-emitting diode) block. The user could then connect the blocks, and configure the logic to detect the condition of the contact switch sensor and the light sensor each outputting false (i.e., indicating that door is open and that it is dark outside). The homeowner could also easily customize the system for multiple garage doors by adding more contact switch sensor blocks and more logic blocks, could customize the system for multiple alerts by adding a splitter block feeding multiple LEDs distributed throughout the house, or could choose a different alert method by replacing the LED block by perhaps a buzzer block. In contrast, using currently available technology, a garage-open-at-night system can be purchased off-the-shelf, but due to low sales volumes, may cost more than many people are willing to pay. Furthermore, the off-the-shelf systems can't be customized easily, such as being extended to monitor two or three garage doors, or providing alerts at multiple locations throughout the house. Additionally, wireless transmitter and receiver blocks are provided to allow a user to replace a wired connection with a receiver-transmitter block pair.

Due, in part, to the ease by which the modules of the present invention can be integrated into a network system, many such systems can be built from many of same basic building blocks: sensors (of motion, light, sound, etc.), logic, and output (LEDs, buzzers, etc.). Hence, such blocks could be produced and sold in large volumes, bringing the cost of each block down to just a few dollars or even cents each.

In one aspect, the modules of the present invention communicate intermittently using packets, with each data packet containing a true or false message (or error message, as will be discussed). Timeouts exist for sending data packets, as well as smaller "alive" packets. Modules preferably utilize unidirectional serial data transmission with a fixed baud rate and hamming error detection and correction. In this manner, systems built using the blocks of the present invention may appear to be continuously communicating, much like a constant-voltage connection in many prior systems. However, the packet-based communication protocol provides for power-saving advantages as a voltage connection between modules is not always "on" and therefore not continuously draining power.

According to one aspect of the present invention, a stand-alone module for use in a user-configurable monitor/control network is provided. The module performs a pre-defined function. The module typically includes an interface component configured to perform a pre-defined function, a processor component configured to interface with the interface component, to implement local computation, to maintain local state information and to implement a packet-based communication protocol for communication with other modules when the module is configured in a network of one or more other stand-alone modules, and a power source component configured to supply power to the interface component and the processor component. In certain aspects, the interface component includes one of a sensor element that detects the presence or absence of an environmental event or a quantity of an environmental attribute, an output generator that generates a physical output, and a computational circuit input element that controls the processor to perform one of a logic computation, a state computation and an arithmetic computation on one or more input Boolean and/or integer values.

According to another aspect of the present invention, a user-configurable monitor/control system comprising at least two stand-alone modules is provided. Each module typically includes an interface component configured to perform a pre-defined function, a processor component configured to interface with the interface component, to implement local computation, to maintain local state information and to implement a packet-based communication protocol for communication with other modules when the module is configured in a network of one or more other stand-alone modules, and a power source component configured to supply power to the interface component and the processor component. The interface component of a first one of the modules includes a sensor element that detects the presence or absence of an event or an environmental condition and that is configured to generate a signal indicative of the condition or event. The processor component of the first module, in response to receiving a signal from the interface component, sends a packet to a second one of said modules, said packet including one of a Boolean value and an integer value indicative of the detected event or environmental condition.

According to yet another aspect of the present invention, a computer-implemented method of simulating the design of a user-configurable monitor/control network is provided. The simulated network typically includes two or more stand-alone network modules. The method typically includes providing a plurality of icons on a portion of a display, each icon representing a functional module, and positioning a first icon in a workspace portion of the display in response to a user selection of the first icon, the first icon representing a sensor module that detects the presence or absence of an environmental event or that detects an environmental condition. The first icon has an output node. The method also typically includes positioning a second icon in the workspace portion in response to a user selection of the second icon, the second icon representing one of an output module, a communication module and a compute module. The second icon has an input node. The method further typically includes displaying a connection between the output node of the first module and the input node of the second module in response to a user selection to connect the first and second modules, and simulating operation of the connected first and second functional modules in response to a user selection of the sensor module output.

According to yet a further aspect of the present invention, a computer-implemented method is provided for reducing a number of nodes in a user-defined simulated monitor/control network comprising a plurality of nodes, wherein each simulated node represents a physical block node. The method typically includes receiving a user selection of a simulated monitor/control network comprising one or more input nodes, a plurality of compute nodes and one or more output nodes, wherein each compute node implements a pre-defined function on one or more input values. The method also typically includes automatically determining two or more compute node partitions using a partitioning algorithm, each partition including one or more of said compute nodes, wherein at least one partition includes two or more compute nodes, and wherein each partition that includes two or more compute nodes represents a physical programmable block node that implements the functionality of the two or more compute nodes for that partition. In one aspect, for each partition that includes two or more compute nodes, code is automatically generated that implements equivalent functionality of the compute nodes in the partition when downloaded into a single physical programmable block node. In another aspect, the code generated for a partition is downloaded to a physical programmable block for use in a physical monitor/control network.

Reference to the remaining portions of the specification, including the drawings and claims, will realize other features and advantages of the present invention. Further features and advantages of the present invention, as well as the structure and operation of various embodiments of the present invention, are described in detail below with respect to the accompanying drawings. In the drawings, like reference numbers indicate identical or functionally similar elements.

BRIEF DESCRIPTION OF THE DRAWINGS

FIG. 1a illustrates examples of components for use in the modules of the present invention, and FIG. 1b illustrates examples of basic sensor, logic and output modules according to an embodiment of the present invention.

FIG. 2 illustrates examples of Boolean blocks and their functions according to the present invention.

FIG. 3 illustrates examples of blocks configured to output and/or process number, or integer, values according to the present invention.

FIG. 4 illustrates examples of various systems built using the blocks of the present invention.

FIG. 9 illustrates aspects of packet transmission and reception for basic sequential nodes according to the present invention.

FIG. 10 illustrates a Design Framework Simulator according to the present invention.

FIG. 12 illustrates pseudocode for a decomposition method according to the present invention.

FIG. 14 illustrates an example of a decomposition method of the present invention using the third design of the podium timer system from FIG. 13.

FIG. 15 illustrates physical blocks according to the present invention.

DETAILED DESCRIPTION OF THE INVENTION

Blocks/Modules

Figure 5:
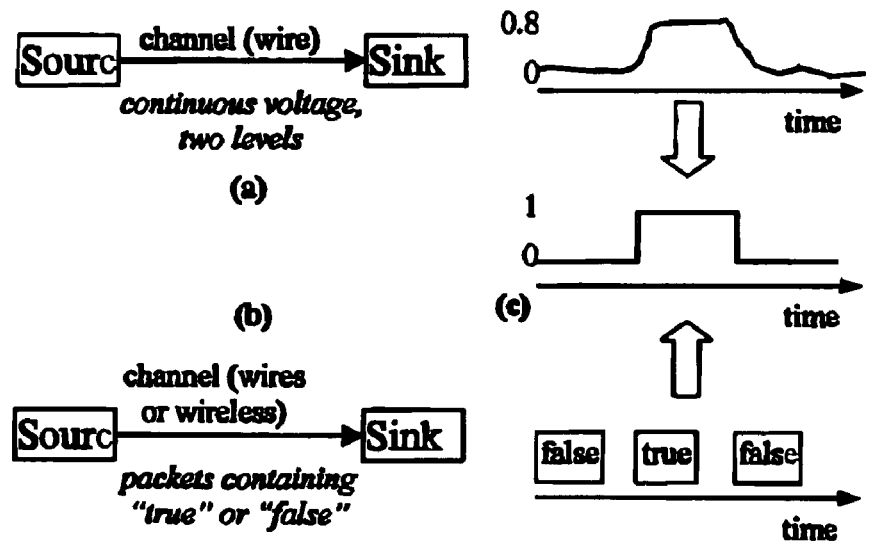
FIG. 5 illustrates logic abstraction according to a traditional model and a model according to the present invention.

The modules of the present invention address a need of enabling people with little or no programming or electronics experience to build basic sensor-based monitor/control system and networks in a convenient and cost-effective manner. It should be noted that the terms "module" and "block" are used interchangeably herein.

In one aspect, certain modules according to the present invention includes a "dumb" component, such as a button, light sensor, motion sensor, LED, buzzer, etc., combined with a low-cost, low-power processor component such as a PIC microcontroller (costing about ninety cents) as illustrated in FIG. 1. Each module includes a standard interface, and modules communicate automatically when connected. In one embodiment, the processor component in each module is preprogrammed to execute a communication protocol as will be discussed in more detail below and a module's compute function, where needed. The communication protocol is used in both wired and wireless network embodiments.

In one aspect, there are four general categories of blocks: sensor blocks, logic/state blocks, communication blocks, and output blocks. These blocks can further be categorized based on their output type: Boolean or Integer. Logic/state blocks are generally referred to as "compute" blocks. Compute blocks are able to operate on Boolean input values, integer input values or both. For example, a compute block may perform a logic computation (e.g., for Boolean yes/no values), a state computation (e.g., for Boolean yes/no and/or integer values), or an arithmetic computation (e.g., for integer values). Compute blocks may output Boolean and/or integer values.

Sensor blocks typically output a Boolean value that will be represented herein as either "yes" or "no" (yes indicating the presence of the event being monitored, such as motion, light, or a button press). Types of Boolean sensor blocks include motion sensors, light sensors, buttons, contact switches, manual switches, noise sensors, etc. FIG. 2(a) illustrates examples of Boolean sensor blocks and their functions. Sensor blocks configured to output an integer, or number, value include the temperature sensor and distance sensor blocks shown in FIG. 3(a).

Logic/state blocks, or compute blocks, typically take one or more inputs from other blocks and generate one or more outputs, each block implementing a basic combinational or sequential function. Logic/state blocks include a 2-input logic block whose DIP switch can be configured to any logic function of 2 inputs; a toggle block that changes state between yes and no for each unique yes input; a tripper block that changes to a yes state when the block's main input is a yes, and that stays in that state until a reset input is a yes; and a pulse generator block that outputs yes and no at rates specified by the user using two dials. A special type of compute block is a programmable block, which features a finite number of inputs and outputs and which can be programmed to implement custom functionality (including functionality of multiple pre-defined blocks). Pre-defined compute functions include combinational functions, like a 2 and 3 input truth table, AND, OR, and NOT, and basic sequential functions, like a toggler, tripper, pulse generator, and delay. FIG. 2 illustrates examples of Boolean compute blocks and their functions, including Arithmetic logic blocks (FIG. 2(c)), timer blocks (FIG. 2(d)), and others (FIG. 2(f)). Additional compute blocks are shown in FIG. 3. For example, arithmetic logic blocks are shown in FIG. 3b, and an additional timer block is shown in FIG. 3c. A turnstile logger block is shown in FIG. 3d.

Communicate blocks include a splitter, and wireless transmit and receive blocks that can replace any wire by a wireless point-to-point link. Wired connections between blocks are preferred, as wired connections make the interconnection structure explicit to the user, consume orders of magnitude less power, and enable communication over much longer distances. However, wireless transmit/receive blocks are provided for situations requiring wireless—a pair essentially replaces a wire, forming a point-to-point link. FIG. 2(e) illustrates examples of communicate blocks and their functions.

Output blocks include an LED, a buzzer, an electric relay that can control power to any electric appliance or device, and a general interface that can be used to control electronic devices (like a digital camera) or to interface to a personal computer. FIG. 2(b) illustrates examples of Boolean output blocks and their functions. An integer display block is shown in FIG. 3a.

FIG. 15 illustrates a variety of blocks according to the present invention. As shown, each block includes a physical housing structure (e.g., plastic housing). In one aspect, a signal indicator, such as red and green LEDs (not shown), is provided with each block, and is configured to activate when an output is active, e.g., green light for "yes," and red for "no." In this manner, a user is able to more easily determine the desired output to assist in configuring the entire system of blocks they have designed.

One key feature of the blocks is that users can learn about the blocks and can iteratively construct and design systems simply by connecting blocks together. Thus, all blocks are preferably interoperable and behave reasonably while being connected and disconnected (i.e., blocks preferably support hot-swapping). In one aspect, blocks include descriptive language on the housing. For example, for logic blocks, a description of the logic function, and any necessary user configurations, e.g., DIP switch settings, are provided. Such description may include color coded logic sentences to allow a user to easily configure the logic based on the colors of outputs from the sensors (e.g., red for no, and green for yes)

In preferred aspects, each block module contains a microcontroller (e.g., a PIC microcontroller such as a PIC 16F62X available from Microchip Technologies Inc.) for computation and communication, and hardware specific to the block's task (i.e., sensors, resistors, voltage regulators, etc.). A power source such as a battery (e.g., 9V as shown in FIG. 15a) is preferably provided in the block, however, a block may be configured to connect to a remote power supply such as a wall plug outlet or other power source, such as a power block. Blocks communicate utilizing a packet-based communication protocol. In preferred aspects, the communication protocol is a uni-directional protocol. All blocks utilize the same compute/communication protocol to achieve interoperability. That protocol involves several parameters, for which value ranges may vary. Examples of discrete parameter values within a range of values follows:

PIC Supply Voltage (V)={3.0, 3.5, 4.0, 4.5, 5.0, 5.5}

PIC Clock Frequency (Hz)={32 k, 100 k, 200 k, 300 k, 455 k, 800 k, 1.6 M, 2M, 3M, 4M, 5.3M, 7.4M, 8M, 10M, 10.4M, 16M, 20M}

Communication Baud Rate (bps)={1200, 2400, 4800, 9600, 14.4K, 28.8K}

Data Packet Size={4 bits, 1 B, 2 B, 4 B}

Data Timeout={0.25 sec, 0.5 sec, 1 sec, 2 sec, 3 sec, 4 sec, 5 sec, 10 sec, 30 sec, 1 min, 5 min, 10 min, 30 min}

Alive Timeout={0.1 sec, 0.25 sec, 0.5 sec, 1 sec, 2 sec, 3 sec, 4 sec, 5 sec, 10 sec, 30 sec, 1 min, 5 min, 10 min}

Error Check/Correct (ECC) Strategy={none, crc, parity, checksum1, checksum2, hamming1, hamming2}

The PIC supply voltage and PIC clock frequency are the voltage and frequency provided to the PIC microcontroller, with ranges determined by databook values. The communication baud rate is the baud rate at which the block sends packet data to other blocks, with the range determined by databook values. The data packet size is the number of bits into which the block's designers encode "yes," "no" and "error" messages.

The data timeout supports reasonable behavior when a user adds new blocks to the network. Whenever a sensor's sampled value changes, the sensor block immediately outputs a packet with the new value. When the sampled value doesn't change, though, the block continues to send the same value at a particular rate (the data timeout rate), so that if a user connects a new block to a sensor block, the new block knows the value and can respond accordingly. Likewise, the alive timeout supports reasonable behavior when a user removes a block from the network. If that block has an input, that block will not receive new packets on that input since the input connects to nothing. That block will notice the disconnect after the data timeout, but that time may be too long (imagine disconnecting a buzzer that continues to buzz for one minute). Thus, the blocks send an "alive" packet, e.g., only 1 bit—just enough to notice an electrical connection—at a rate specified by the alive timeout. The alive timeout should thus be less than the data timeout to be useful.

ECC is the type of error checking and correction bits added to the basic data packet. The none ECC strategy does not detect or correct any errors. The parity ECC strategy utilizes odd parity and sends a single parity bit for every 8-bit data packet, resulting in transmission of 9-bit packets. The crc ECC strategy transmits an extra packet containing the remainder of the data packets and a CRC-3 generating polynomial. The checksum1 ECC strategy transmits an extra packet consisting of the corresponding sum of the data packets. The checksum2 ECC strategy negates the extra packet before transmission. The hamming1 ECC strategy considers the data as a matrix and generates row and column parity error checking packets. The hamming2 ECC strategy embeds parity bits within the packets at every power of two bit location (bit 1, 2, 4, etc.)

While blocks conceptually always transmit or receive yes's or no's, in one aspect the microprocessor puts the system to sleep a significant portion, e.g. 99%, of the time, sending yes's or no's only if there is a change on the input, or if a (user configurable) timeout has been reached (e.g., 2 or 3 seconds), in order to save power. For example, a user may configure a block to sample input (e.g., is light present for a light sensor) periodically. Other types of timeouts are defined to ensure comfortable use when users are connecting and disconnecting modules. In one aspect, the modules communicate serially using a 4-bit packet, representing yes, no, or error. Additional details of the communication protocol will be discussed below.

Although the modules of the present invention eliminate the need for programming or electronics experience, users still may need to configure a compute block to specify its functionality, for example, by setting positions on a DIP switch. Additionally, programmable blocks are also provided and may be automatically programmed with the desired functionality, for example using the code generation tool as will be discussed in more detail below. Programmable blocks are particularly useful to introduce unique functionality and to reduce the overall number of modules required in a network. For example, the function of multiple interacting blocks can be determined and coded using the code generation tool, and this code may then be downloaded into one or several programmable blocks. Thus, it will be appreciated that a properly configured programmable block may replace any set of one or more, and preferably two or more, compute blocks as discussed herein.

Systems

FIG. 4 illustrates examples of various systems that may be built using the modules of the present invention. Users choose block components according to their pre-defined function, and connect these blocks to build the desired system. Because the user designs and builds the system, the system can be as specialized as the user desires. Furthermore, the interfacing and communication aspects are already taken care of, thus, users do not need any programming or electronics expertise to configure the blocks to other aspects. Individual blocks can be utilized for a wide range of systems and would be inexpensive to produce in high volumes, providing inexpensive, flexible solutions.

Systems can be characterized, from simplest to most complex, as sensor-to-output, sensors-with-logic, sensors-with-state, and sensors-with-logic-and-state.

A sensor-to-output system typically includes at least one sensor block and at least one output block. Design of a sensor-to-output system typically requires that the user select the appropriate sensor and output blocks and connect those blocks to implement a particular application. Such systems might include a doorbell system, a system that sounds a beeper when someone is in the backyard, a system that turns on a fan when there is light in a room, and a system that turns on an LED when someone is standing at a copy machine.

A sensors-with-logic system typically includes at least two sensor blocks, at least one compute block and at least one output block. Design of a sensor-with-logic system typically requires that the user use at least two sensors and feed the sensors' outputs through a logic block before connecting to an output. Examples might include a daytime doorbell system, a garage door open at night system, and a motion at night detector system. Examples of such systems include the animal monitoring system shown in FIG. 4(*b*) and the detect and transmit portion of the sleepwalker detection system shown in FIG. 4(*d*).

A sensor-with-state system typically includes at least one sensor block, at least one compute block and at least one output block. Design of a sensor-with-state system typically requires that the user connect a sensor with a state block and then an output. These systems might include a blinking doorbell, an 8-second doorbell, a package delivery system which detects motion and triggers a beeper until the system is reset by a user, and a front desk notifier which turns on a beeper until a user presses the same button to turn the beeper off. An example of such a system includes the wireless doorbell system shown in FIG. 4(a).

A sensors-with-logic-and-state system typically includes at least two sensor blocks, one or more compute blocks and at least one output block. Design of a sensor-with-logic-and-state system typically requires that the user connect multiple sensors through logic and state blocks before connecting to an output block. An example is the cafeteria food alert system, requiring both a toggle block and 2-input logic. The cafeteria food alert system is shown in FIG. 4(c).

Additional examples of systems utilizing Boolean and Integer blocks are described in Appendix A.

Another block that is useful in a system of blocks is a power block that provides power to a cluster of one or more connected blocks. The sole purpose of a power block is to provide power to one or more connected blocks. The power block may receive its power from a wall outlet, solar panel or other source, obviating the need for batteries in blocks in the cluster. To implement a power block in a cluster, in one aspect, an additional wire is included in the wire bundle and connector that connects blocks. This additional wire allows for a power sharing connection between all blocks, with or without a power block in the cluster. For example, if one block's battery dies, that block can still operate from the power source of the other connected blocks, e.g., blocks having live batteries. If a power block is connected in a cluster, another block may use the power from the power block as a direct power source or as a backup source, e.g., in the event of battery failure.

Packet-Based Communication Protocol

In the basic traditional digital abstraction, a connection between a source and sink node typically includes a wire that possesses one of two voltage levels. These voltage levels correspond to the Boolean values false and true, represented as 0 and 1, respectively. The level representing false may be 0 Volts, while the level for true may be say 0.8 Volts. In fact, each level is typically a range, e.g., 0-0.2 Volts, and 0.7-0.9 volts. In the basic abstraction, one of these two levels must continuously exist on the wire, as illustrated in FIG. 5(a). Otherwise, any switches or devices to which the wire connects may behave in an undefined manner. Actually, intermediate values may exist for a short period during level transitions.

The continuous two-level underlying voltage assumption is not appropriate for sensor nodes. The main reason is power consumption. Sensor nodes may be battery powered (perhaps using an AA battery or watch battery, for example) and should last for months or years using the same battery. Yet supplying a continuous voltage between two nodes consumes too much power, as those nodes do not co-exist on an IC, but instead exist in separate packages. Continuously driving a several inch wire connecting two packages may itself drain a battery within just days. And continuously driving a wireless channel connecting two nodes consumes even more power than driving a wire, draining a battery in perhaps just hours. Additionally, driving a wireless channel continuously would require a dedicated wireless transmission medium for just that channel, whereas such transmission media are typically quite limited and must be shared by many channels.

In one embodiment, to conserve power, instead of continuous voltage, the source node only transmits data intermittently, and does not drive any value on the communication channel most of the time. In this embodiment, the digital abstraction for sensor nodes therefore assumes underlying communication using packets to transmit true or false between nodes, as illustrated in FIG. 5(b).

It is not necessary to specify how the nodes transmit or receive packets. In one aspect, serial transmission of packets among nodes is used. For wired serial transmission, two wires are preferably used, one for data and one for ground, but other transmission mechanisms may be used. For example, wired transmission could utilize the X10 protocol over household power wires. For wireless serial transmission, any of various existing wireless communication protocols may be used, such as Zigbee or Bluetooth. The packet transmission method of the present invention makes up part of a Boolean sensor node technology, in the same way that particular voltage levels, rise and fall times, setup and hold times, wiring fanout limits, etc., make up a traditional logic gate technology.

Traditional switches fail infrequently. Thus, the most basic logic abstraction uses just two logic values, 0 and 1—more advanced abstractions introduce additional values, like undefined, high-impedance, etc. However, due to the nature of sensor nodes, it is expected that sensor node "failure" will be a normal part of operation, with failure caused by undesirable but common situations like batteries losing energy or nodes being damaged, or by normal situations like nodes being replaced ("hot-swapped") while a network is active. Thus, an "error" value is part of the most basic logic abstraction, indicating that the value is not known to be true or false, but rather that something is functioning improperly. As used herein, logic signal diagrams are drawn with error values represented as a line between 0 and 1 and labeled "error." An error value plays a similar role to that of an "undefined" value in modern logic abstractions. A node with an "error" input typically outputs an "error" also, unless the node's output can be determined independently of the input with the error value (e.g., in the case of an OR block with a 1 on one input and an error on the other).

The traditional digital abstraction maps an imperfect real signal to a perfect logic signal, and so too does the abstraction for sensor nodes. In particular, a traditional abstraction allows variances in voltage levels, as shown in FIG. 5(a). The voltage level on the wire may fluctuate slightly while at a particular level, and does not rise from the low level to the high level instantaneously. However, the traditional digital abstraction maps this imperfect signal onto a perfect logic signal, as shown in FIG. 5(c). At the same time, the traditional abstraction imposes requirements on the source node, requiring it for example to keep voltage under a certain maximum value.

Figure 6:
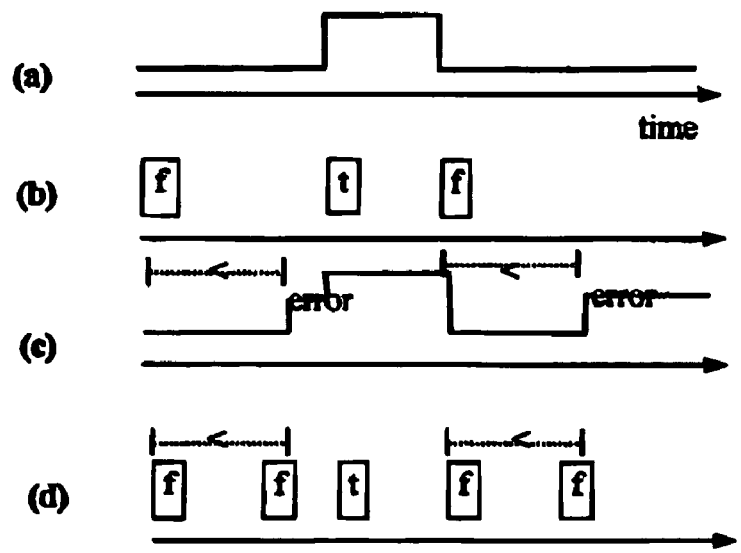
FIG. 6 illustrates mapping of packets of the present invention to the traditional digital abstraction model.

As with the traditional digital abstraction, in the present invention, the digital abstraction based on packets maps a series of intermittent packets to a perfect continuous logic signal, as also illustrated in FIG. 5(c). Such a mapping preferably imposes certain constraints on a properly behaving source node. The most straightforward constraint approach requires that the source node transmit a new packet only when there is a logic value change. For example, if a source node intends the sink node to see the logic signal in FIG. 6(a), the source would send a packet for each change (as well as the initial value) as shown in FIG. 6(b).

One must realize that packets take some time to send and receive. However, the diagrams are drawn assuming that the packet is sent and received instantaneously at the leading (left) edge of the packet symbol in the diagram. In reality, the sink node's logic signal will be delayed by the packet transmission time. This instantaneous assumption is the same as used in drawing traditional logic timing diagrams, which typically assume wires have zero delay.

The delay in processing an input packet and generating an output packet is akin to the delay of a logic gate. Sensor node libraries can be made to indicate the input to output delays.

Different versions of the same type of node may exist, with each version having a different delay.

This straightforward approach of sending packets only during logic value changes has a drawback. In particular, as described earlier, failure of a node must be considered a normal aspect of sensor node operation, but the packet-on-changes-only approach does not deal with failures well. For example, suppose in FIG. 6(b) that the source node fails after sending the last false packet, never sending another packet (not even an error packet). The sink node will never detect this failure, believing instead that the source intended for the false value to persist.

A solution that deals better with failed nodes imposes an additional requirement on the source node, stating the maximum time separation between any two packets. A maximum inter-packet time constraint is illustrated in FIG. 6(c) using the dotted line segment with the "<" symbol. Because the sink did not receive a new packet within the maximum time after the first false packet, the sink assumes an error has occurred. Soon after the error situation, the sink receives a true packet, and then a false packet. But again the maximum time passes, causing the sink to assume another error, as shown in the figure.

In one aspect, a source node sends a repeat of the previously sent packet before the maximum inter-packet time expires, as illustrated in FIG. 6(d), even if no change of the logic signal should occur. Such a sequence of packets ensures the sink constructs the logic signal shown in FIG. 6(a). Note that the source sends a packet immediately (or after some delay) when the logic signal should change, not waiting for the maximum time. Furthermore, notice that a packet sent due to a change starts a new count of the inter-packet time. Finally, the source need not wait the duration of the maximum inter-packet time before sending a repeat packet.

If a sink does not receive a packet within the maximum inter-packet time, the sink treats the input as having an "error" value, propagating the error to the sink's output if appropriate. If the node is sequential, the node designer must take care to define whether a valid packet following an error, identical in value to the packet preceding the error, is treated as a new logic value or a continuation. For example, true—error—true could be interpreted as one long true with a temporary error, or two distinct true values. These different interpretations may result in different behavior in a sequential node, the latter causing a change of state. In many cases, the node designer may choose to treat an error as a type of "reset" that causes a state change to an initial or reset state.

In the traditional logic abstraction, a source must not switch the logic signal too quickly, since otherwise a sink gate may not switch properly. Similarly, a sensor source node should not send packets too quickly, since otherwise a sink node may miss those packets. Thus, a minimum inter-packet time is defined, in one aspect, as the minimum time that must exist between any two sent packets an a node's output. Thus, any properly functioning sink node in this aspect, should be able to process incoming packets on a single input that arrive separated by just the minimum inter-packet time, which represents the fastest packet rate and hence the maximum communication throughput.

Figure 7:
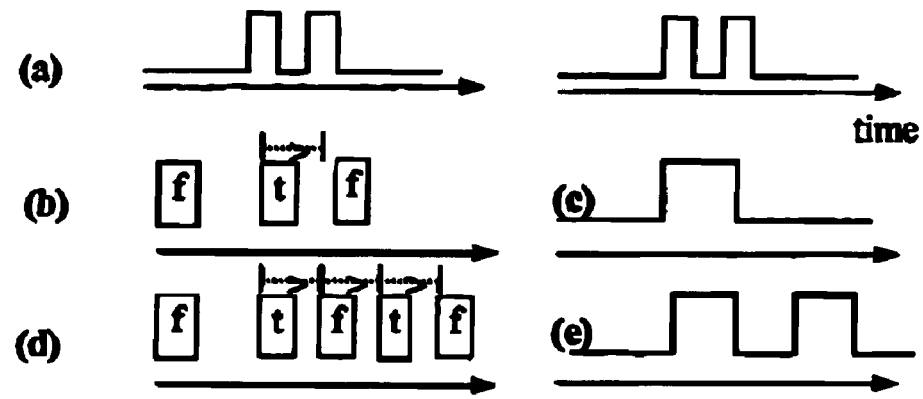
FIG. 7 illustrates aspects of minimum inter-packet time according to the present invention.

The source node should respect this minimum inter-packet time even if the source wishes to change the logic signal more rapidly. For example, a light sensor may experience rapid changes in sensed light, as illustrated in FIG. 7(a) showing a minimum inter-packet time using dotted line segments with the ">" symbol. The sensor detects a rapid change from false, to true, to false, to true, and back to false. However, the first change from true to false occurs faster than the minimum inter-packet time, so the light sensor cannot send a new false packet. At the end of the minimum inter-packet time, the input has already changed back to true, and thus in FIG. 7(b), the source has chosen to treat the intermediate false input as a glitch. The sink never sees the intermediate false value, as shown in FIG. 7(c). Alternatively, the source could choose to send an intermediate false packet after the minimum inter-packet time as shown in FIG. 7(d), causing a delay in the signal. The source, which must therefore have some sort of internal buffer, waits for another minimum time period, and then sends a true packet, thus further delaying the signal. After yet another minimum time, the source sends the final false packets, even further delayed (at some point, the source's buffer may overflow and thus buffered packets may get dropped). The resulting signal, shown in FIG. 7(e), reflects all the detected light changes but with a delay. Both packet sequences obey the minimum inter-packet time constraint and thus both are valid; the designer of the source sensor node must choose which method makes most sense for the particular node's function and expected usage.

Consider packet arrivals for a input logic node. In response to receiving a new packet on any input, the node computes the logic value of the node's output. If the value stays the same, the node need not send a new output packet (but may). If the value changes, then the node should send a new output packet carrying the new logic value. Of course, the node must also obey the maximum and minimum inter-packet time constraints described in the previous section.

Note that, because nodes are not synchronized, two source nodes connected to the two-inputs of a logic node may send packets that arrive at the logic node separated by less than the minimum inter-packet time. The logic node must be designed to properly process such packets, because such packet timing does not violate the minimum inter-packet time, which applies to a single input only. In fact, packets on two inputs may even arrive simultaneously. In one aspect, the physical block implementation handles this by using two parallel serial receiver components (e.g., UARTs), one for each input.

Also notice that a node may carry out different algorithms in deciding when to transmit an output packet. FIG. 8(a) shows an example network of sensor nodes, with a logic node in the middle. FIG. 8(b) shows an example sequence of input packets arriving at the logic node from two sensors. The perceived logic signal is represented as a dashed line. Notice that the two true packets arrive at almost the same time. If the logic node follows an as-late-as-possible scheme for generating output packets, then the node need not send a second false packet until the maximum inter-packet time expires, as shown in FIG. 8(c). Likewise, the node need not send another false packet when the node's A input receives a true packet, because the output should still be false. However, when the node's B input receives a true packet, the node should output a true packet, as shown.

Alternatively, the logic node might follow a different output scheme, wherein the node outputs a new packet whenever the node receives a new packet, as in FIG. 8(d). Thus, the node outputs a false packet after receiving the true packet on input A. The node cannot immediately send a true packet after receiving the true packet on input B, because the node would otherwise violate the minimum inter-event time on its output. Thus, the node must wait until the minimum inter-event time passes, and then send the true packet, resulting in a delayed output. Nevertheless, both output sequences are legal.

It can be seen that different internal implementations of a logic node may result in different output packet sequences, but that ultimately the received logic values will be the same, perhaps with slight timing variations. For example, consider a two-input AND logic node in which both inputs receive new packets simultaneously, changing the two input values from 1 and 0 to 0 and 1. If the AND node is implemented such that the node processes the second input first and outputs a new value, the node will see inputs of 1 and 1 and thus change its output from 0 to 1 by outputting a 1 packet. The node will then look at the first input and thus see inputs of 0 and 1, resulting in the node outputting 0. If the AND is implemented to look at both inputs before outputting a new value, the 1 packet might never be sent. The output of a 1 packet is a glitch. Note also that slight variations between input arrival times may occur due to different length paths leading to each input, also possibly causing glitching.

Glitching is common in traditional gates and can be dealt with in sensors similarly to switches. In particular, it is desirable to ensure that the glitch does not get "caught" by a sequential node down the line resulting in a changed state. In sensor-based applications, however, the timing scale is far coarser than in traditional gates, and thus applications inherently will rarely depend on such detailed timing issues.

Figure 8:
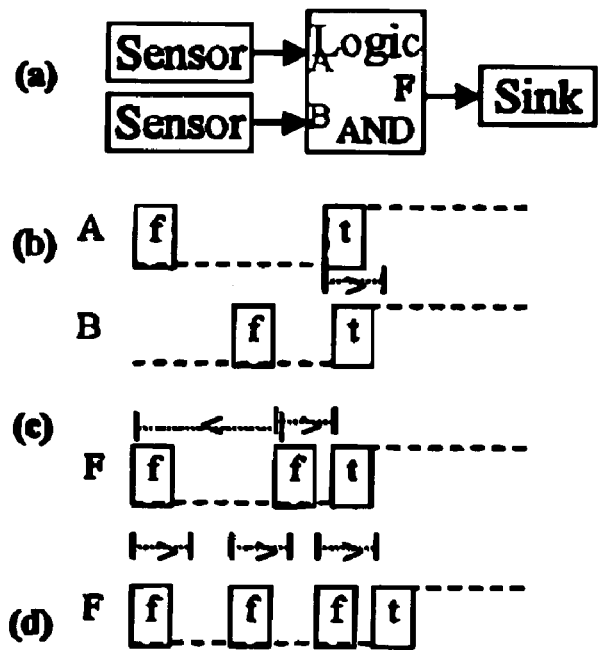
FIG. 8 illustrates aspects of packet transmission and reception according to the present invention.

According to one aspect of the present invention for logic values, a logic signal value is defined as the same as the previously received packet value. FIG. 8 illustrates such mapping by superimposing the logic signal on the same diagram as the packets.

For logic gates, a sensor logic node represents a function mapping input logic values to an output logic value, just as in the traditional abstraction. A sensor node has a different internal delay model, may treat certain input sequences as glitches that do not get passed through, and may generate glitches, but delays and glitches are also present in traditional logic gates.

With the emphasis on packets, one might perceive the abstraction as being event-based. But the abstraction results in continuous logic signals; the underlying packet-based model is indeed event-based, but gets mapped to a continuous system—each node maintains the continuous model, remembering previous values, and uses the underlying events (packets) for changes.

In the traditional digital abstraction, latches and flip-flops represent a basic bit storage node. Types include RS, JK, T and D. One common naming convention for latches and flip-flops says that a basic latch has no clock input and hence has inputs that can always have impact, a level-sensitive latch's inputs have impact only when a clock input is asserted, and a flip-flop's inputs can have impact only on the rising (or falling) edge of a clock input.

Sensor nodes require a different set of nodes for bit storage. In sensor nodes, there is no global clock signal. Thus, communication among nodes is asynchronous. Hence, the distinction among a basic latch, level-sensitive latch, and flip-flop does not exist. Furthermore, the types of systems built using sensor nodes differ from the types of systems built using traditional logic gates, requiring basic nodes with sensor-relevant behavior.

For sensor systems, the following basic sequential nodes have been found to be useful:

"1" Prolonger: This node, illustrated in FIG. 9(a), has one input and one output. The node prolongs the end of an input 1 pulse by a specified duration. One might also call this node a "delay" node, but the node only delays the end of a 1 pulse.

Toggle: This node, illustrated in FIG. 9(b), has one input and one output. The node maintains an internal state of either 1 or 0, which the node outputs. A 1 pulse at the input changes the internal state from either 1 to 0, or 0 to 1.

Tripper: This node, illustrated in FIG. 9(c), has two inputs A and Reset, and one output. The node maintains an internal state of either 1 or 0. A 1 on the A input trips the node into a 1 state, The node stays in the 1 state until a 1 appears on the Reset input. Input A has priority over Reset.

Pulse generator: This node may have one input and one output. The input effectively acts as an enable to indicate whether a signal should be generated. One example pulse generator, as shown in FIG. 9(d), has no input and one output. A user configures high and low time to generate a periodic signal.

It should be understood that a basic sequential node for a sensor network could therefore include any sequential behavior, utilizing perhaps a state machine capture or configuration method on a node's physical block.

With respect to the digital abstraction of the present invention, for the basic sequential nodes, the durations of input pulses do not matter (i.e., the number of "1" packets received or the time between a "1" packet and a subsequent "0" packet does not matter). The prolonger node outputs a "1" when seeing an input "1," and then starts its prolong timer only after seeing a change from input "1" to input "0." Notice in FIG. 9(a) that if a second input "1" appears during the prolong time, the previous prolong time is ignored and a new prolong time starts when the next input "0" appears. The toggle node only changes state when the input changes from "0" to "1" (a rising input edge) and is not impacted by the duration of the "1" pulse. The tripper also only changes state during the rising input edges.

Note that the tripper node's behavior subsumes the behavior of a basic RS latch, and therefore the tripper node enables the nodes of the present invention to model any sequential behavior that a traditional abstraction enables. In particular, input A acts like an RS latch's S input, and input Reset like the R input. The tripper has more functionality than an RS latch because the tripper defines behavior when both A and Reset are true, giving priority to A (in contrast, and RS latch's behavior is undefined if both inputs are 1). Other latch types (JK, T, D), can be built using an RS latch and logic, one can use tripper and logic nodes to build arbitrary sequential circuits.

Note that FIG. 9 shows the perfect logic signals only, and not packets. With an established abstraction, underlying physical details are omitted as it can be assumed that the underlying packet implementation obeys the specific timing rules. The same is done in the traditional logic abstraction, in which perfect signals are drawn, which is assumed to represent underlying physical voltage levels behaving within specific ranges and tolerances.

Design Framework Simulator

In one embodiment, computer-implemented simulation tools are provided to allow a user to specify and design a system using the modules of the present invention, as well as automatically synthesize code for download into programmable blocks. FIG. 10 illustrates the design framework simulation tools of the present invention. As shown, the framework 10 includes a design entry simulation tool 20 and a synthesis tool 30, both of which will be described below. Framework 10 and its various components may be coded to execute in a standalone PC or Framework 10 may be coded to execute in a network environment (e.g., mainframe-terminal, web service, application server on Internet, etc.).

Figure 11A:
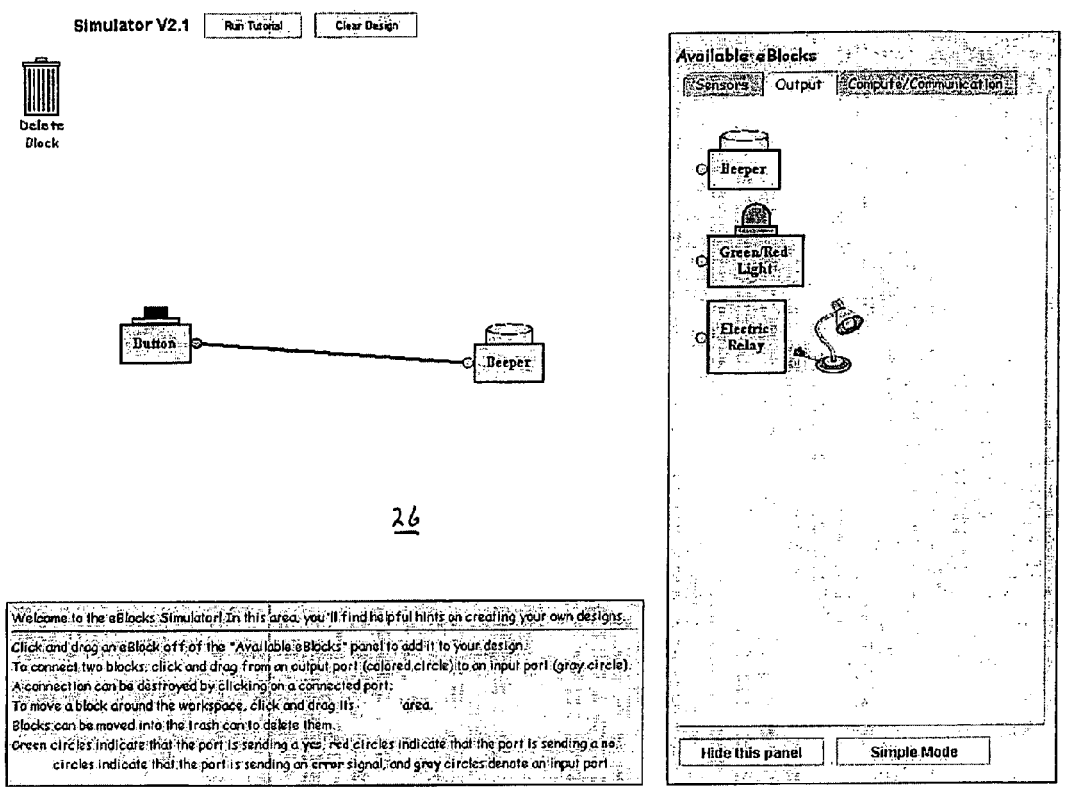
FIG. 11 illustrates various GUI screenshots of a system design entry and simulation tool according to the present invention.
Figure 11B:
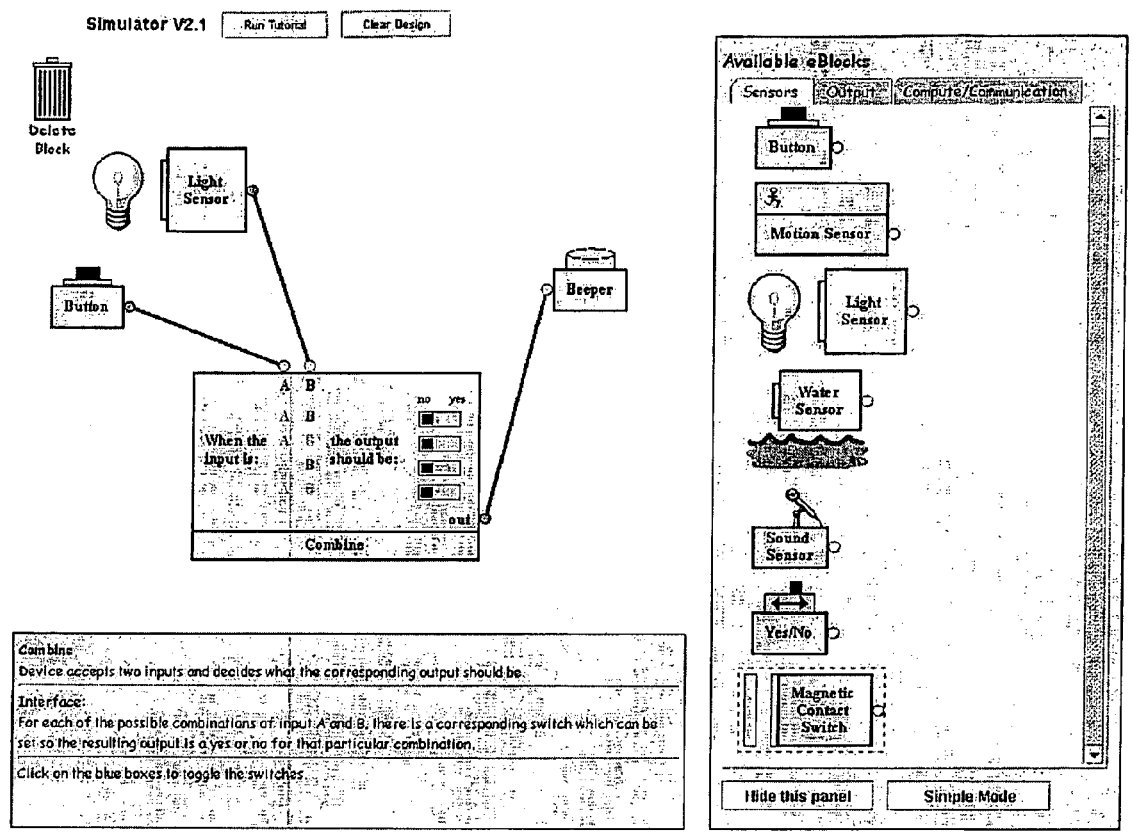
Figure 11C:
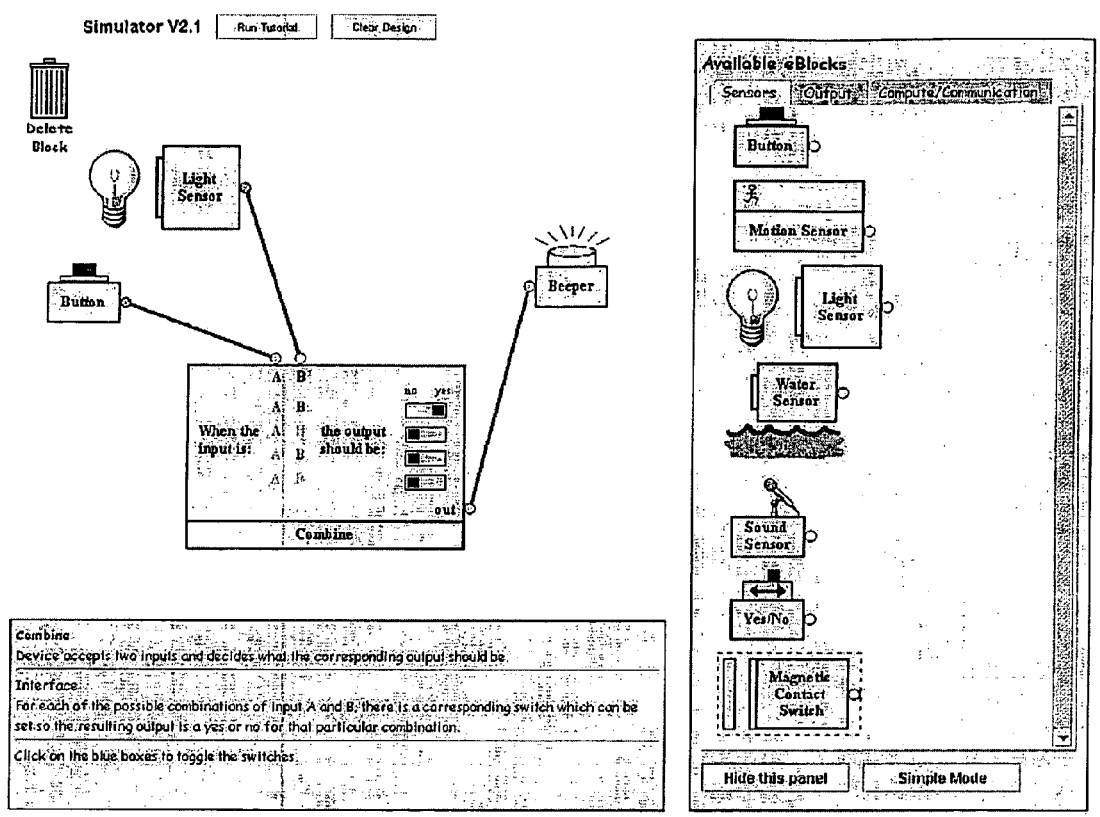
Figure 11D:
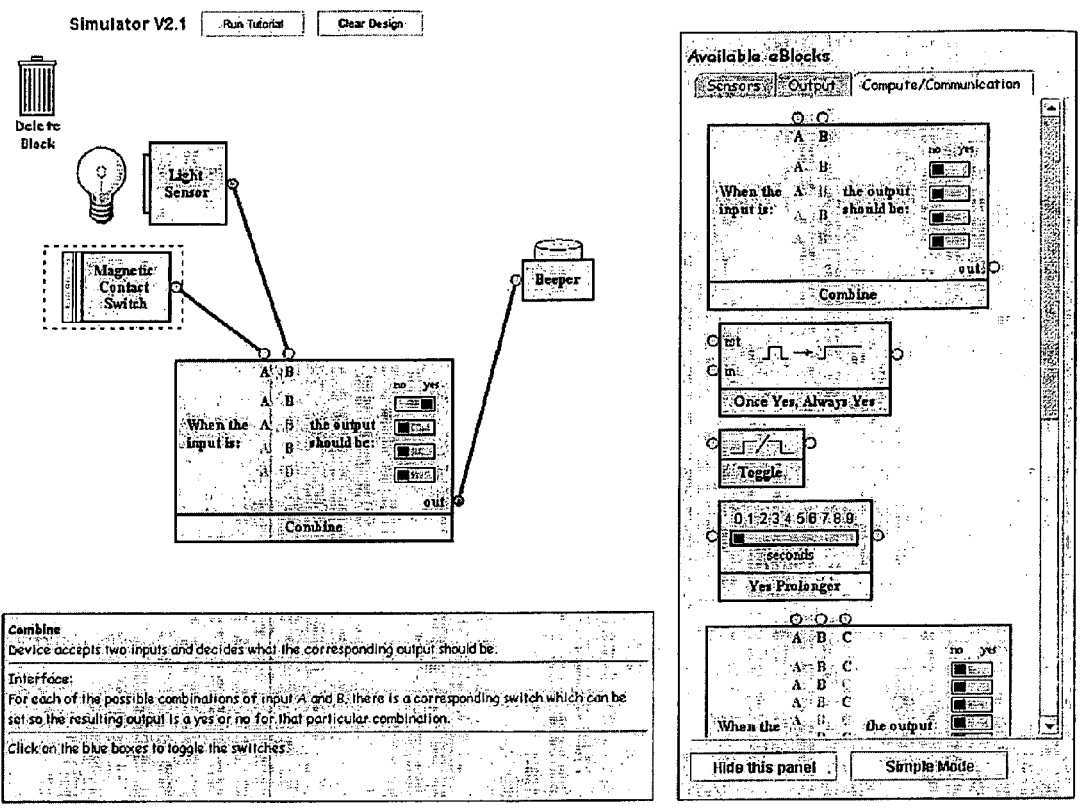
Figure 11E:
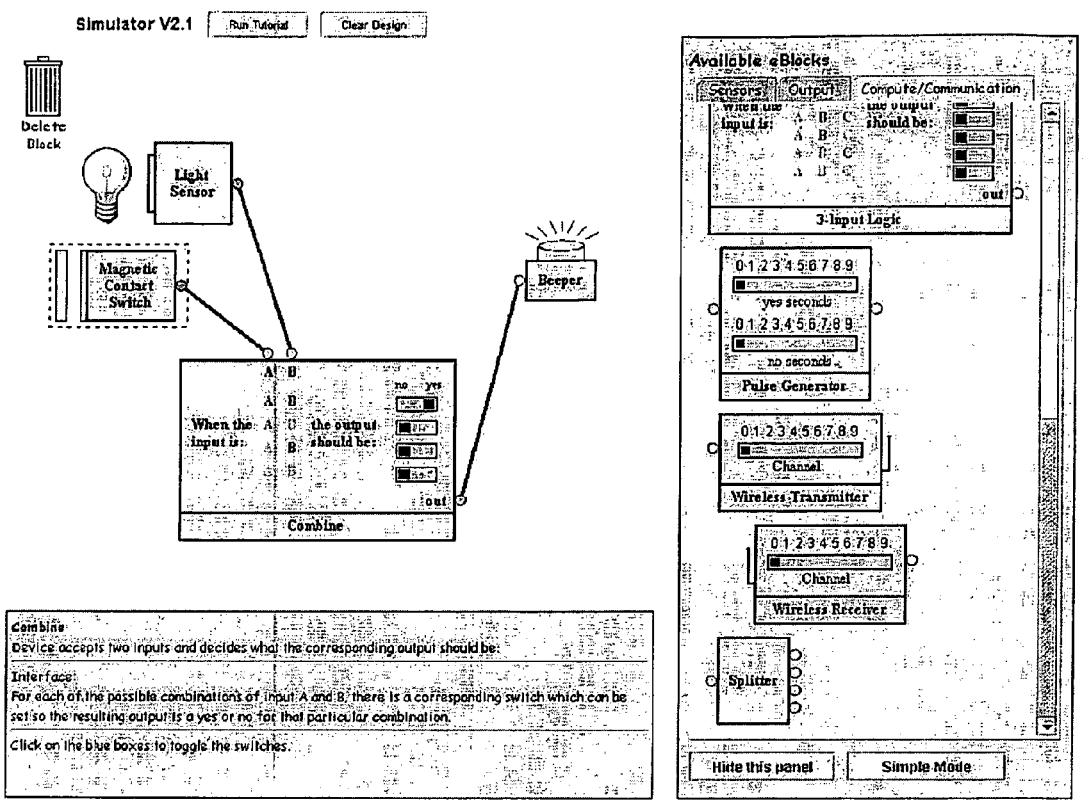

In one aspect, the design entry and simulation tool 20 includes a Java-based graphical user interface (GUI) module 22 and simulator engine 24. Using simulation tool 20, as shown in FIG. 11, the user can drag a block from a catalog of blocks, situated on the right edge of the simulator, to the workspace 26 and connect the blocks together by drawing lines between circular representations of their input/outputs. Blocks that sense or interact with their environment are simulated with an accompanying visual representation of their environmental stimuli/interaction (e.g. clicking on a light sensor will toggle a light bulb icon on and off). As shown in FIG. 11, available sensor blocks (e.g., FIG. 11b), output blocks (FIG. 11a) and compute and communicate blocks (FIGS. 11d and 11e) may be selected, dragged and dropped into workspace 26. FIGS. 11d and 11e illustrate a simulation of a garage door open-at-night system, including the logic configuration of the compute block. As shown, in FIG. 11e, when the light sensor sends "no" (dark outside) and the magnetic contact switch sends "no" (door open) the beeper is made to sound.

In one aspect, the simulator contains behavioral representations of all available blocks. It also understands the underlying communication protocol and all the restrictions on the model of computation (i.e., no cyclic connection, the concept of "human time," etc.). In one aspect, the simulation is behaviorally correct, but no detail timing can be inferred. Given that all communication between blocks is done serially using packets and hence globally asynchronous, and because the blocks deal with human-scale events rather than fast timing, such lack of timing detail is generally not a problem.

In one aspect, the simulation tool 20 ("simulator") provides an interactive graphical environment to a user, for example, with sensors that can be activated with mouse clicks, green/red lights on nodes to indicate their output values, and actions added to output blocks (e.g., audible beeping over a PC's speakers). The simulator maintains a global clock variable, and then updates internal states of each node in a round-robin manner, generating screen or audio events when appropriate. In the simulator, certain parts of the abstraction are obeyed, like maximum inter-packet time. Other parts (like minimum inter-packet time) relate to low-level implementation issues that are not necessary to model in the nodes if the simulator is not intended to model particular physical implementations. A timing-specific simulator may be implemented, for example, in VHDL and SystemC or other language as is well known.

After completing a design in the simulator, the user can instruct the Framework 10 to minimize the number of computation blocks needed by implementing with the same functionality using a minimum, or reduced, number of programmable blocks. The design is passed from the design simulator 20 into the partitioning tool 32, which produces a list of one or more partitions based on a partitioning algorithm. Each partition is subsequently passed to the code generation tool 34, where the interaction between the partition's inputs and component blocks is translated into sequential code that can run on a programmable block. Code may be downloaded to a programmable block via a direct wired connection to a desktop computer or through wireless transmission.

Using the Design Framework, different partitioning algorithms may be utilized for different designs. A detailed discussion of the partitioning problem and the algorithms used will be presented below.

The code generation tool 34 is used for each partition generated by the partitioning tool 32. In one aspect, each block within the partition is assigned a level, defined as the maximum distance between the block and any sensor block (analogous to the primary input-based level definition in circuit partitioning). Level assignment is achieved by tracing the paths in the network, beginning with sensor blocks, and marking each block that is visited with an appropriate level. Blocks visited multiple times are given the greatest level value assigned to them.

The behavior of each block is defined in the simulator, e.g., in a Java-like language, and is automatically transformed into a syntax tree. The code generator attaches the syntax trees of every block in the partition so that the trees can be evaluated in succession. Ordering is determined by the level of each block and is in non-decreasing order. The ordering of the syntax trees ensures that no block's tree is evaluated before any of its input blocks have produced output. As each block's tree is merged into the new programmable block's tree, tree nodes that access a block's input or output are changed into a variable access, where appropriate (e.g., communication between two blocks in a partition will occur internally in a programmable block via variables). In the event that two or more blocks share variable names in their internal behavior code, the conflict is resolved through variable renaming (e.g., a number is appended to one of the variable names).

The newly merged syntax tree specifies the behavior of the programmable block that will replace the partition and is evaluated in the same manner as a non-programmable block through the simulator's interpreter. A user can select a programmable block and instruct the simulator to translate the syntax tree into code, e.g., C code, for downloading and use in a physical programmable block.

For example, one programmable block utilizes a Microchip PIC16F628 microcontroller with 2 Kbytes of program memory. Given that amount of program memory, the small size of each program describing a pre-defined block's function, and the scale of real block systems, practical assumption can be made that a programmable block's program size constraint will not be violated by any partition. Making such violation even less likely is the fact that the block-partitioning problem is actually input/output limited, not size limited. However, even if for some reason a programmable block's memory size were exceeded, a PIC with a larger memory could be used.

As mentioned above, the general aim of the partitioning phase is to minimize the total number of blocks by replacing the greatest number of pre-defined compute blocks with a fewer number of programmable blocks. Pre-defined compute blocks typically have identical internal components and thus typically have equal cost. A programmable compute block may have slightly higher cost due to the programmability hardware, but likely less cost than two pre-defined compute blocks.

A more precise statement of the problem is as follows. A block system can be represented as a directed acyclic graph G=(V, E) where V is the set of nodes (blocks) in the graph and E is the set of edges (connections) between the nodes. Sensor blocks are defined as primary inputs and output blocks as primary outputs. The objective of the partitioning phase is to find a set of subgraphs of non-primary input and non-primary output nodes (hereafter referred to as inner nodes) of G such that 1) each subgraph has at most i inputs and o outputs, where i and o correspond to the number of inputs and outputs available in a programmable block, 2) each subgraph must be replaceable by a programmable block that can provide equivalent functionality, and 3) the number of inner blocks after replacement is minimized. A subgraph containing only a single node is considered invalid, as it is undesirable to replace a single pre-defined compute block with a single programmable compute block due to the slightly higher cost of the latter.

As mentioned above, different algorithms may be used. In one embodiment, a decomposition method is used. This is referred to as a "PareDown" heuristic. Other methods include an aggregation method and an exhaustive search method. One skilled in the art will recognize other suitable methods. FIG. 12 illustrates, in pseudocode, an example of the PareDown heuristic. This method begins by selecting all internal blocks of a design as a candidate partition, and then removes blocks from the partition until input and output constraints are met, hence the moniker "decomposition method." If a valid partition is found, the algorithm repeats on the remaining blocks. This process continues until no new partitions are found.

The choice of which block to remove from an invalid candidate partition is determined by computing a rank value for certain blocks in the candidate partition and removing the block with the lowest rank. Only blocks that send output to or receive input from a block outside of the candidate partition are assigned a rank. Such blocks are referred to as border blocks. A block's rank is defined as the net increase or decrease in the combined indegree and outdegree of a candidate partition if that block is removed from the candidate partition. Indegree is the number of inputs to a block, and outdegree is the number of outputs from a block. For blocks that have the same rank, removal priority is given to the following criteria, in order: 1) the block with the greatest indegree, 2) the block with the greatest outdegree, 3) and the block's level.

The decomposition method benefits from fast run times and produces results well beyond the practical range of the exhaustive search method. A worst-case design would feature inner blocks that can fit into a partition by themselves but cannot form a valid partition when combined with any other block or blocks. A design of this form containing n inner blocks would therefore require n iterations through the algorithm's main loop. The first iteration would check for a valid partition n times before eventually isolating a single block as a partition (an invalid result). Subsequent iterations check for valid partitions n−1 times and so forth. Accordingly, the total iterations through the decomposition method is n*(n+1)/2, or the sum of 1 to n. This total yields a time complexity of $O(n^2)$ (on the order of n squared computation time).

Figure 13:
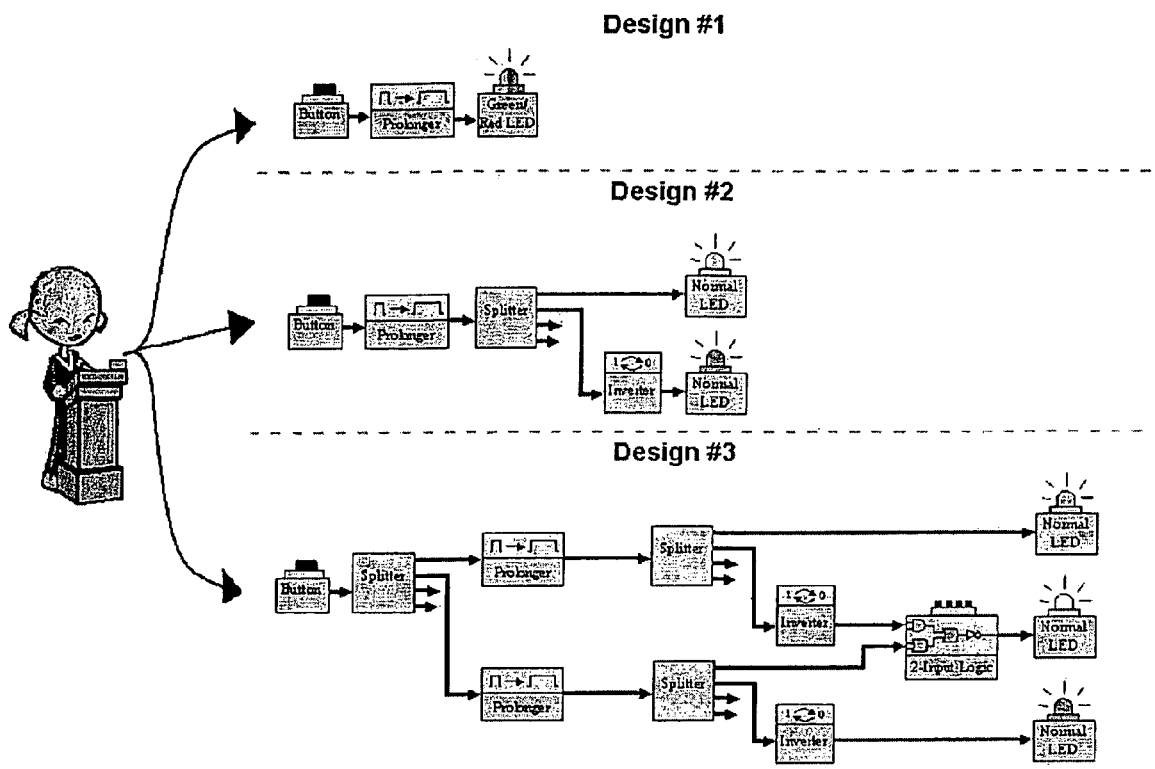
FIG. 13 illustrates 3 different designs for a podium timer system built using blocks according to the present invention.

As an example, the PareDown heuristic partitioning of the third "Podium Timer" design shown in FIG. 13 will be demonstrated. The podium timer utilizes a set of blocks to build a system that can notify a person that his/her talk time is nearing the end, and that time has ended. The design includes a button, output LEDs, and several internal pre-defined compute nodes, including combinational and sequential nodes.

The DAG representation of the design is shown in FIG. 14(a). For ease of reference, each block has been assigned a number. Also shown in FIG. 14(a) is the initial selection by the PareDown heuristic of every interior block as a candidate partition, indicated by the shaded area, and the rank values for the border nodes 2, 8, and 9. It is assumed that the programmable block available features 2 inputs and 2 outputs.

Since the shaded partition in FIG. 14(a) requires 3 outputs, the partition is invalid. Node 9, having the least rank value, is removed, as shown in FIG. 14(b). The partition in FIG. 14(b) remains invalid and nodes 2 and 8 are considered for removal, being the border nodes. The two border nodes have the same rank but node 8 has a greater indegree and is removed, as shown in FIG. 14(c).

The subsequent step removes node 7 from the partition, and the partition becomes valid, as indicated by the solid outline in FIG. 14(d). The algorithm is repeated on the remaining node(s): 7, 8, 9. Node 7 is removed from the new candidate partition, and the new partition becomes valid.

Again, the heuristic runs on the unpartitioned node(s), which consists only of node 7. Though the partition fits in a programmable block, the partition is invalid for containing only a single block. The heuristic halts, returning the result visualized in FIG. 14(e). Thus, the heuristic reduces the internal compute nodes from the initial user-defined 8 nodes to only 3 nodes.

Additional partitioning algorithms include exhaustive search and aggregation method algorithms. For exhaustive search, the search space consists of every combination of n blocks into n programmable blocks (a combination need not use every block). A simple pruning mechanism may be used in which all "empty" programmable blocks in a combination are treated as indistinguishable, and portions of the search tree are removed accordingly. For example, if at a given point in the search tree a block can be assigned to one of three empty programmable blocks, only one such branch is considered.

The run time of partitioning by exhaustive search naturally increased exponentially. In one test, with designs featuring fourteen inner blocks, the search did not conclude after four hours. Such run time of exhaustive search is not acceptable for designs with as few as eleven inner blocks, where a user must wait for about one minute. An exhaustive search is therefore overly prohibitive as blocks designs with eleven or more inner blocks are not uncommon, and thus a different approach is needed.

For the aggregation method, a heuristic that clusters nodes into subgraphs through aggregation may be used. From a list of inner nodes connected to a primary input, the aggregation method selects a node that fits within a programmable block as a partition. The initial node's output nodes are added to the partition as long as each addition maintains the partition's ability to fit in a programmable block. Subsequent additions' input nodes are also examined as candidate additions. This process is repeated on unpartitioned nodes until no new partitions can be found. Blocks in a partition created by the aggregation method are contiguous; therefore, in conjunction with the scheduling used by the code generation tool, the partitions are guaranteed to maintain equivalent functionality when transformed into a programmable block.

Though the aggregation method concludes quickly for cases in which the exhaustive search is rendered impractical, the aggregation method is generally not capable of taking advantage of convergence and thus may often produce non-optimal results. For large designs in which convergence is more common, it was found that the aggregation method did not reliably produce near-optimal results.

While the invention has been described by way of example and in terms of the specific embodiments, it is to be understood that the invention is not limited to the disclosed embodiments. To the contrary, it is intended to cover various modifications and similar arrangements, in addition to those discussed above, as would be apparent to those skilled in the art. Therefore, the scope of the appended claims should be accorded the broadest interpretation so as to encompass all such modifications and similar arrangements.

What is claimed is:

1. A stand-alone module for use in a user-configurable monitor/control network, wherein said module performs a pre-defined function, the module comprising:

an interface component that performs a pre-defined function;

a processor component that interfaces with the interface component, implements local computation, and maintains local state information wherein the processor component executes a uni-directional packet-based communication protocol for communication with other modules when the module is configured in a network of one or more other stand-alone modules; and a power source component configured to supply power to the interface component and the processor component.

2. The module of claim 1, wherein the power source component includes one of a battery or a circuit configured to convert power from an external voltage source.

3. The module of claim 1, wherein the module further includes at least one of a uni-directional input port for receiving communication packets from other modules and a uni-directional output port for sending communication packets to other modules.

4. The module of claim 1, wherein the interface component includes one of a sensor element that detects the presence or absence of an environmental event or a quantity of an environmental attribute, an output generator that generates a physical output, or a computational circuit input element that controls the processor to perform one of a logic computation, a state computation or an arithmetic computation on one or more input values.

5. The module of claim 1, wherein the interface component includes a sensor element that detects the presence or absence of an event and generates a boolean signal, wherein the processor component is configured to send a packet to another module including a Boolean value in response to receiving the Boolean signal.

6. The module of claim 5, wherein the sensor element is selected from the group consisting of a light sensor, a motion sensor, a magnetic contact switch, a sound sensor, a water sensor, a button and a keypad.

7. The module of claim 1, wherein the interface component includes a sensor element that detects an environmental condition and generates an integer signal, wherein the processor component is configured to send a packet to another module including an integer value in response to receiving the integer signal.

8. The module of claim 7, wherein the sensor element is selected from the group consisting of a temperature sensor and a distance sensor.

9. The module of claim 1, wherein the interface component includes an output generator that generates a physical output in response to a control signal, wherein the processor component is configured to receive a packet from another module including a Boolean value and to generate the control signal based on the received Boolean value.

10. The module of claim 9, wherein the output generator is selected from the group consisting of an audible beeper, an LED, a light, an electric relay, and an electric lock.

11. The module of claim 1, wherein the interface component includes an output generator that generates a physical output in response to a control signal, wherein the processor component is configured to receive a packet from another module including an integer value and to generate the control signal based on the received integer value.

12. The module of claim 11, wherein the output generator includes an integer display device.

13. The module of claim 1, wherein the interface component includes a user-configurable computation circuit input element that controls the processor component to perform one of a logic computation, a state computation or an arithmetic computation, wherein the processor component is configured to receive packets from one or more other modules, each packet including one of a Boolean value and an integer value.

14. The module of claim 13, wherein the computation circuit input element includes a logic computation circuit selected from the group consisting of a two input Boolean logic circuit with a DIP switch, and a three input Boolean logic circuit with a DIP switch.

15. The module of claim 1, wherein the interface component includes a computation circuit input element that controls the processor component to operate as one of a threshold circuit, a range circuit, a counter circuit or an arithmetic computation circuit.

16. The module of claim 1, wherein the interface component includes a computation circuit input element that controls the processor component to operate as one of a Boolean timer, an integer timer, a toggle, a prolonger, a pulse generator, a switch, an error detector or a turnstile logger.

17. The module of claim 1, wherein the interface component includes one of a wireless transmitter, a wireless receiver, or a computation circuit input element that controls the processor component to operate as one of a splitter, an Internet controller, an Internet status monitor, a telephone controller or a telephone status monitor.

18. The module of claim 1, wherein the processor is configured to control communication with other modules such that packets are sent intermittently so as to conserve operating power.

19. The module of claim 1, wherein the interface component includes one or more user-configurable inputs, the configuration of which controls the processor to generate an output according to the pre-defined function.

20. A system comprising two or more stand-alone modules according to claim 1, wherein said two or more modules communicate using said packet-based communication protocol.

21. The system of claim 20, wherein packets are transmitted intermittently between the two or more modules in such a manner that communication between the modules appears to be continuous.

22. A user-configurable monitor/control system comprising at least two stand-alone modules, each module comprising:
   an interface component that performs a pre-defined function;
   a processor component that interfaces with the interface component, implements local computation, and maintains local state information wherein the processor component executes a uni-directional packet-based communication protocol for communication with other modules when the module is configured in a network of one or more other stand-alone modules; and
   a power source component configured to supply power to the interface component and the processor component;
   wherein the interface component of a first one of the modules includes a sensor element that detects the presence or absence of an event or an environmental condition and that is configured to generate a signal indicative of the condition or event, and wherein the processor component of the first module, in response to receiving a signal from the interface component, sends a packet to a second one of said modules, said packet including one of a Boolean value and an integer value indicative of the detected event or environmental condition.

23. A set of embedded electronics blocks for a user-configurable monitor network, the set of electronic blocks comprising:
   a sensor block having a sensor, a processor, and a uni-directional interface, the sensor enabled to generate a signal, the processor enabled to send a packet through the uni-directional interface in response to the generated signal;
   a compute block having a first uni-directional interface operatively coupled to the sensor block uni-directional interface, a logic circuit enabled to perform predefined compute functions on packets received from the sensor block and to generate and send output packets through a second uni-directional interface;

a splitter block having a first, second, and third uni-directional interface operatively coupled to a processor, the splitter block processor enabled to duplicate packets received from the first uni-directional interface to both the second and third uni-directional interfaces;

a first output block having a uni-directional interface and an output generator, the output generator configured to generate a physical output in response to packets from the splitter block second uni-directional interface; and a second output block having a uni-directional interface and an output generator, the output generator of the second output block configured to generate a physical output in response to packets from the splitter block third uni-directional interface.

24. A set of embedded electronics blocks for a user-configurable monitor network, the set of electronic blocks comprising:

a first sensor block having a sensor, a processor, and a uni-directional interface, the sensor enabled to generate a signal, the processor enabled to send a packet through the uni-directional interface in response to the generated signal;

a second sensor block having a sensor, a processor, and a uni-directional interface, the second sensor block sensor enabled to generate a signal, the second sensor block processor enabled to send a packet through the second sensor block uni-directional interface in response to the second sensor block generated signal;

a compute block having a first uni-directional interface operatively coupled to the first sensor block uni-directional interface, a second uni-directional interface operatively coupled to the second sensor block uni-directional interface, a logic circuit enabled to perform predefined compute functions on packets received from the first and second sensor blocks and to generate and send an output through a third uni-directional interface; and an output block having a uni-directional interface and an output generator, the output generator configured to generate a physical output in response to the output from the compute block.

* * * * *